(12) United States Patent
Stevens et al.

(10) Patent No.: US 12,275,589 B2
(45) Date of Patent: *Apr. 15, 2025

(54) MATERIAL HANDLING SYSTEM

(71) Applicant: OPEX Corporation, Moorestown, NJ (US)

(72) Inventors: Alexander Stevens, Moorestown, NJ (US); Joseph Valinsky, Moorestown, NJ (US)

(73) Assignee: OPEX Corporation, Moorestown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/382,159

(22) Filed: Oct. 20, 2023

(65) Prior Publication Data

US 2024/0109726 A1 Apr. 4, 2024

Related U.S. Application Data

(63) Continuation of application No. 17/885,619, filed on Aug. 11, 2022, now Pat. No. 11,975,920, which is a
(Continued)

(51) Int. Cl.
 *B65G 1/137* (2006.01)
 *B25J 9/16* (2006.01)
 (Continued)

(52) U.S. Cl.
 CPC .......... *B65G 1/1375* (2013.01); *B25J 9/1687* (2013.01); *B65G 1/0471* (2013.01);
 (Continued)

(58) Field of Classification Search
 CPC .. B65G 1/1375; B65G 1/0471; B65G 1/0492; B65G 1/065; B65G 1/10; B65G 1/1373
 See application file for complete search history.

(56) References Cited

U.S. PATENT DOCUMENTS 10,040,632 B2 8/2018 Lert, Jr.
10,435,241 B2 * 10/2019 Lert ..................... B65G 1/0478
(Continued)

FOREIGN PATENT DOCUMENTS

CN 108706265 A 10/2018
CN 110077773 10/2018
(Continued)

OTHER PUBLICATIONS

International Search Report and Written Opinion for International application No. PCT/US2020/046562 issued on Feb. 16, 2021.
(Continued)

*Primary Examiner* — Kyle O Logan
(74) *Attorney, Agent, or Firm* — Brian Dinicola

(57) ABSTRACT

A system may include a vehicle for delivering items and a plurality of racks having a plurality of storage locations. The racks may be arranged to form one or more aisles. The vehicles are configured to drive horizontally along a path that may extend along a path under the racks that is parallel to the aisles. Additionally, the vehicles may be operated to turn while the vehicle is positioned under one of the racks. The vehicles may travel under the racks and cross one or more aisles to reach a particular column in one of the aisles. The vehicle climbs upwardly within the particular column to retrieve an item from a storage location in the column.

11 Claims, 11 Drawing Sheets

Related U.S. Application Data continuation of application No. 16/994,543, filed on Aug. 14, 2020, now Pat. No. 11,472,632.

(60) Provisional application No. 62/886,602, filed on Aug. 14, 2019.

(51) Int. Cl.
| | |
|---|---|
| *B65G 1/04* | (2006.01) |
| *B65G 1/06* | (2006.01) |
| *B65G 1/10* | (2006.01) |
| *G05D 1/00* | (2006.01) |
| *G05D 1/69* | (2024.01) |
| *G05D 1/692* | (2024.01) |
| *G06Q 10/087* | (2023.01) |

(52) U.S. Cl.
CPC ........... *B65G 1/0492* (2013.01); *B65G 1/065* (2013.01); *B65G 1/10* (2013.01); *B65G 1/1371* (2013.01); *B65G 1/1373* (2013.01); *B65G 1/1376* (2013.01); *B65G 1/1378* (2013.01); *G05D 1/0027* (2013.01); *G05D 1/69* (2024.01); *G05D 1/692* (2024.01); *G06Q 10/087* (2013.01)

(56) References Cited

U.S. PATENT DOCUMENTS

| | | | |
|---|---|---|---|
| 10,435,242 B2 | 10/2019 | Lert, Jr. | |
| 10,472,172 B2 | 11/2019 | Goren et al. | |
| 10,952,533 B2* | 3/2021 | Lert, Jr. | ................. B65G 1/065 |
| 11,142,398 B2* | 10/2021 | Lert, Jr. | ................ B65G 1/0492 |
| 11,472,632 B2 | 10/2022 | Stevens et al. | |
| 2003/0185657 A1 | 10/2003 | Stefani | |
| 2007/0065258 A1 | 3/2007 | Benedict | |
| 2017/0158430 A1 | 6/2017 | Raizer | |
| 2017/0267452 A1* | 9/2017 | Goren | ................. B65G 1/0492 |
| 2018/0037412 A1* | 2/2018 | Lynch | ...................... B65G 1/00 |
| 2018/0148259 A1* | 5/2018 | Gravelle | ................. B65G 1/04 |
| 2018/0305122 A1 | 10/2018 | Moulin | |
| 2019/0270588 A1* | 9/2019 | Otto | ...................... B65G 1/1378 |
| 2021/0090001 A1* | 3/2021 | Glass | ........................ B66F 9/07 |

FOREIGN PATENT DOCUMENTS

| | | |
|---|---|---|
| CN | 109987366 | 7/2019 |
| EP | 1348646 | 10/2003 |
| JP | 8157016 | 6/1996 |
| WO | 2018189110 | 10/2018 |
| WO | 2019072432 | 4/2019 |

OTHER PUBLICATIONS

Extended Search Report issued in Europe for Application No. 20853496.6 on Aug. 7, 2023.

Search Report and Written Opinion issued in Singapore for Appl. No. 11202201238V on Mar. 11, 2024.

Examination Report issued in Canada for Appl. No. 3,147,519 on Mar. 19, 2024.

"Petition for Inter Partes Review Under 35 U.S.C. §312 AND 37 C.F.R. §42.104" issued in Case No. IPR2024-00850 on May 2, 2024.

Office Action issued in China for Appl. No. 2024012902982170 on Jan. 29, 2024.

Office Action issued in China for Application No. 2020800712372 on Sep. 27, 2024.

Office Action issued in Japan for Application No. 2022-508888 on Nov. 5, 2024.

* cited by examiner

MATERIAL HANDLING SYSTEM

PRIORITY CLAIM

This application is a continuation of U.S. patent application Ser. No. 17/885,619 filed on Aug. 11, 2022, which is a continuation of pending U.S. patent application Ser. No. 16/994,543 filed on Aug. 14, 2020, which claims priority under 35 U.S.C. § 119 to U.S. Provisional Patent Application No. 62/886,602 filed on Aug. 14, 2019. The entire disclosure of each of the foregoing applications is hereby incorporated herein by reference.

FIELD OF THE INVENTION

Embodiments of the present invention generally relate to automated material and article handling systems which can be used in warehouse, storage and/or distribution environments.

BACKGROUND

Modern material handling systems, such as those used in mail-order warehouses, supply chain distribution centers, and custom-order manufacturing facilities, face significant challenges in responding to requests for inventory articles. In their incipiency, enterprises will generally invest in a level of automation that is at least adequate for current needs. As the scale of an inventory management system expands to accommodate a greater number and variety of articles, however, so too does the cost and complexity of operating it to simultaneously complete the packing, storing, replenishment, and other inventory management tasks for which it is intended.

Failure to efficiently utilize resources such as space, equipment, and manpower in an inventory management facility results in lower throughput, longer response times, and a growing backlog of unfinished tasks. Greater efficiency may often be achieved, for a time, by incrementally expanding the capacity of the facility's existing automation infrastructure, particularly when that expansion follows a well-conceived plan for growth. Sooner or later, however, a point of diminishing returns is encountered. That is, the achievement of further gains in capacity and/or functionality eventually becomes cost prohibitive as compared to available alternatives, if such gains can be realized at all. When that point of diminishing returns is reached, a facility operator may be forced to abandon pre-existing material handling infrastructure and to replace that infrastructure with a completely new automation platform.

SUMMARY OF THE INVENTION

The present invention provides a number of inventive aspects that relate to material handling and/or storage and retrieval processes.

According to one aspect, the present invention provides a method for delivering items to storage locations and retrieving items from storage locations. The method may include the step of providing a plurality of storage racks spaced apart from one another forming a plurality of aisles. Each storage rack may include a plurality of columns and each column may include a plurality of storage locations. The method may also include the step of providing a plurality of delivery vehicles wherein each vehicle includes a horizontal drive system operable to drive the vehicle along a horizontal surface. The vehicles may also include a vertical drive operable to drive the vehicle vertically and a transfer mechanism operable to transfer an item between the vehicle and one of the storage locations. The method may also include the step of driving a first one of the vehicles to drive the first vehicle to the storage racks. Optionally, the method includes the step of driving the first vehicle along a first path under a first one of the racks wherein the first rack is adjacent a first one of the aisles and wherein the first path extends in a direction parallel to the first aisle and spaced apart from the first aisle. The method may also include the step of turning the first vehicle while the first vehicle is under the first rack. Additionally, the method includes the step of driving the vehicle into the first aisle and driving the first vehicle upwardly in the aisle to a first of the storage locations. An item may be transferred between the first vehicle and the first storage location. The first vehicle may then be driven downwardly in the aisle until the vehicle is on a horizontal surface. The first vehicle may then driven across the first aisle and then out from under the storage racks after the step of driving the first vehicle across the first aisle.

According to another aspect a method for delivering items may include a storage rack having a plurality of vertical posts form a first column of the first storage rack and a first vehicle having a first width extending from a first side of the first vehicle to a second side of the first vehicle. The first vehicle may also include a vertical drive that projects outwardly from the first side and the second side so that the vehicle has a second width corresponding to the distance between outer edges of the vertical drive so that the second width is greater than the first width and wherein the vertical posts of the first column are spaced apart a distance greater than the first width and less than the second width.

According to yet another aspect, a method for delivering items may include a plurality of vertical tracks segments attached to vertical posts of a first column and the method may include the step of aligning the vertical drive of the first vehicle with the vertical track segments.

According to another aspect, the present invention may provide a method for delivering items that includes the step of driving a first portion of a vertical drive of a vehicle through a vertical track segment and driving a second part of the vertical drive into operative engagement with the vertical track segment.

According to a further aspect, a method for delivering items may include the step of driving a first vehicle along a first path by driving the vehicle along a path spaced apart from the vertical posts by a distance greater the half the length of the vehicle.

According to yet another aspect, a method for delivering items may include the step of driving a first vehicle to a workstation to present an item to an operator after driving the first vehicle out from under storage racks.

According to a further aspect, a method for delivering items may include the step of driving the first vehicle across the aisle by driving the first vehicle under a second of the storage racks.

According to another aspect, a method for delivering items may include the step of turning a vehicle by rotating the vehicle about a vertical axis that extends through the vehicle. Optionally, the vertical axis may extend through the first path.

According to a further aspect, a method for delivering items may include the step of driving a second vehicles under a first rack along a second path parallel to a first path so that a second vehicle passes the first vehicle as the first vehicle travels along the first path.

According to a further aspect, a material handling system for delivering items to storage locations and retrieving items from storage locations is provided. The system may include a first storage rack having a plurality of columns each of which comprises a plurality of storage locations wherein the first storage rack is longitudinally elongated and a second storage rack having a plurality of columns each of which comprises a plurality of storage locations wherein the second storage rack is longitudinally elongated. The first storage rack may be spaced apart from the first storage rack to provide an aisle between the first and second storage racks. Additionally, the system may include a plurality of delivery vehicles. Optionally, each vehicle may have a length and a width and each vehicle include a horizontal drive system operable to drive the vehicle along a horizontal surface, a vertical drive operable to drive the vehicle vertically, and a transfer mechanism operable to transfer an item between the vehicle and one of the storage locations. The system may also include a track positioned in the aisle. Additionally, the vertical drive may be configured to cooperate with the track to drive the vehicle vertically upwardly. The system may also include a first horizontal path that extends under the first rack in a direction parallel to the aisle and a second horizontal path that extends under the first rack in a direction parallel to the aisle. Optionally, the horizontal drive is configured to turn the vehicle under the first rack by rotating the vehicle about a vertical axis that extends through the vehicle. Additionally, the storage rack may include a plurality of vertical posts and the first and second horizontal paths may each be spaced apart from the vertical posts a distance greater the one half the length of the vehicles. Further, the first horizontal path under the path may be spaced apart from the first horizontal path a distance greater than the width of the vehicles.

According to a further aspect a system for delivering items may include a vertical drive having a plurality of rotatable elements that each rotate about a horizontal axis. Additionally, the system may include a horizontal drive that includes a plurality of rotatable elements that each rotate about a horizontal axis transverse the axes of rotation of the vertical drive elements.

According to yet another aspect, the present invention may provide a system for delivering items that includes a plurality of vertical posts that form a first column of a first storage rack and vehicles that have a first width extending from a first side of the vehicle to a second side of the vehicle. The vertical drive of the vehicle may project outwardly from the first side and the second side so that the vehicle has a second width corresponding to the distance between outer edges of the vertical drive so that the second width is greater than the first width. Optionally, the vertical posts of the first column are spaced apart a distance greater than the first width and less than the second width.

According to a further aspect, a system for delivering items may include a track that includes drive elements configured to cooperate with a vertical drive so that rotating the vertical drive about a horizontal axis operates to drive the vehicle upwardly along the track. Optionally, the track includes a lower section and an upper section wherein the drive elements are spaced apart further in the lower section then the upper section to provide gaps in the lower section.

A system wherein the gaps are configured to facilitate the vertical drive passing through the gaps without contacting the lower section when the vehicle is driven past the lower section.

According to an additional aspect, the present invention may provide a method for delivering items to storage locations and retrieving items from storage locations. The method may include the steps of providing a vehicle having a horizontal drive and a vertical drive having a forward rotatable element adjacent a front end of the vehicle and a rearward rotatable element adjacent a rear end of the vehicle and providing a first vertical track on a first side of a first column. The first vertical track may have drive elements configured to cooperate with the forward rotatable element to drive the vehicle upwardly. The method may also include the step of providing a second vertical track on second side of the first column wherein the second vertical track has drive elements configured to cooperate with rearward rotatable element to drive the vehicle upwardly. The vertical drive and the first and second vertical tracks may be configured so that the vertical track impedes displacement of the vehicle along a horizontal path when the vertical drive is rotated into a position of misalignment. Additionally, the method may aligning the vertical drive that may include the steps of rotating the forward rotatable element about a horizontal axis substantially parallel with the horizontal path to align the forward rotatable element with gaps in the first and second vertical tracks and rotating the rearward rotatable element about a horizontal axis substantially parallel with the horizontal path to align the rearward rotatable element with gaps in the first and second vertical tracks. After the step of aligning, the method may include the step of driving the vehicle along the horizontal path toward the first vertical track. The step of driving may include driving the vehicle so that the forward rotatable element passes through the gaps in the second vertical track. The method may also include the step of continuing to drive the vehicle along the horizontal path to position the forward rotatable element in operative engagement with the first track and the rearward rotatable element in operative engagement with the second track. The forward and rearward rotatable elements may be rotated to drive the vehicle upwardly toward a first storage location. Additionally, a first item may be transferred from the first storage location to the vehicle, the vehicle may be driven downwardly with the item and the vehicle may be driven with the first item along the horizontal path so that the rearward rotatable element passes through gaps in the first vertical track.

According to yet another aspect, a method of delivery items may include a step of rotating forward and rearward rotatable elements by synchronously driving the forward and rearward rotatable elements to drive the vehicle vertically upwardly while maintaining the orientation of the vehicle relative to the horizon.

According to yet another aspect, a method of delivery items may include a step of driving a vehicle out from under a track after driving the vehicle with the first item along a horizontal path.

According to another aspect, a method of delivery items may include a step turning a vehicle to a path perpendicular to the horizontal path that the vehicle was travelling along. Optionally the step of turning may be performed while the vehicle is under one of the racks.

According to a further aspect, a method of delivery items may include a step of driving the vehicle along the horizontal path. The step of driving may include the step of driving a plurality of horizontal drive elements about a horizontal axis that is substantially perpendicular to the horizontal path.

According to an additional aspect, a method of delivery items may include the steps of providing a plurality of storage racks and a plurality of delivery vehicles. The storage racks may be spaced apart from one another forming a plurality of aisles and each storage rack may include a plurality of columns and each column may include a plurality of storage locations. Optionally, each vehicle may include a horizontal drive system operable to drive the vehicle along a horizontal surface. Each vehicle may also include a vertical drive operable to drive the vehicle vertically. Optionally, a transfer mechanism may be operable to transfer an item between the vehicle and one of the storage locations. The method may also include the step of driving a first of the vehicle under one or more of the storage racks along a path that crosses one or more aisle. The step of driving the first vehicle may include driving the first vehicle into a first of the columns in a first of the aisles. The first vehicle may be driven vertically upwardly within the first aisle until the first vehicle is adjacent a first of the storage locations. An item may be transferred from the first storage location to the first vehicle. The first vehicle may then be driven vertically downwardly within the first aisle and then driven out of the first aisle via a path that extends under at least one of the storage racks.

According to yet another aspect, a method of delivery items may include a path that includes a portion passing under one of the racks and extending parallel to one of the aisles. Optionally, a second vehicle may be driven past the first vehicle under the one rack as the first vehicle is driven along the portion of the path under the one of the racks.

According to a further aspect, a method of delivery items may include a step of turning the vehicle while the vehicle is under one of the racks. The step of turning may include turning the vehicle to align the vehicle with a path perpendicular to the first aisle. Optionally, the step of turning the vehicle may include rotating the vehicle about a vertical axis passing through the vehicle.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
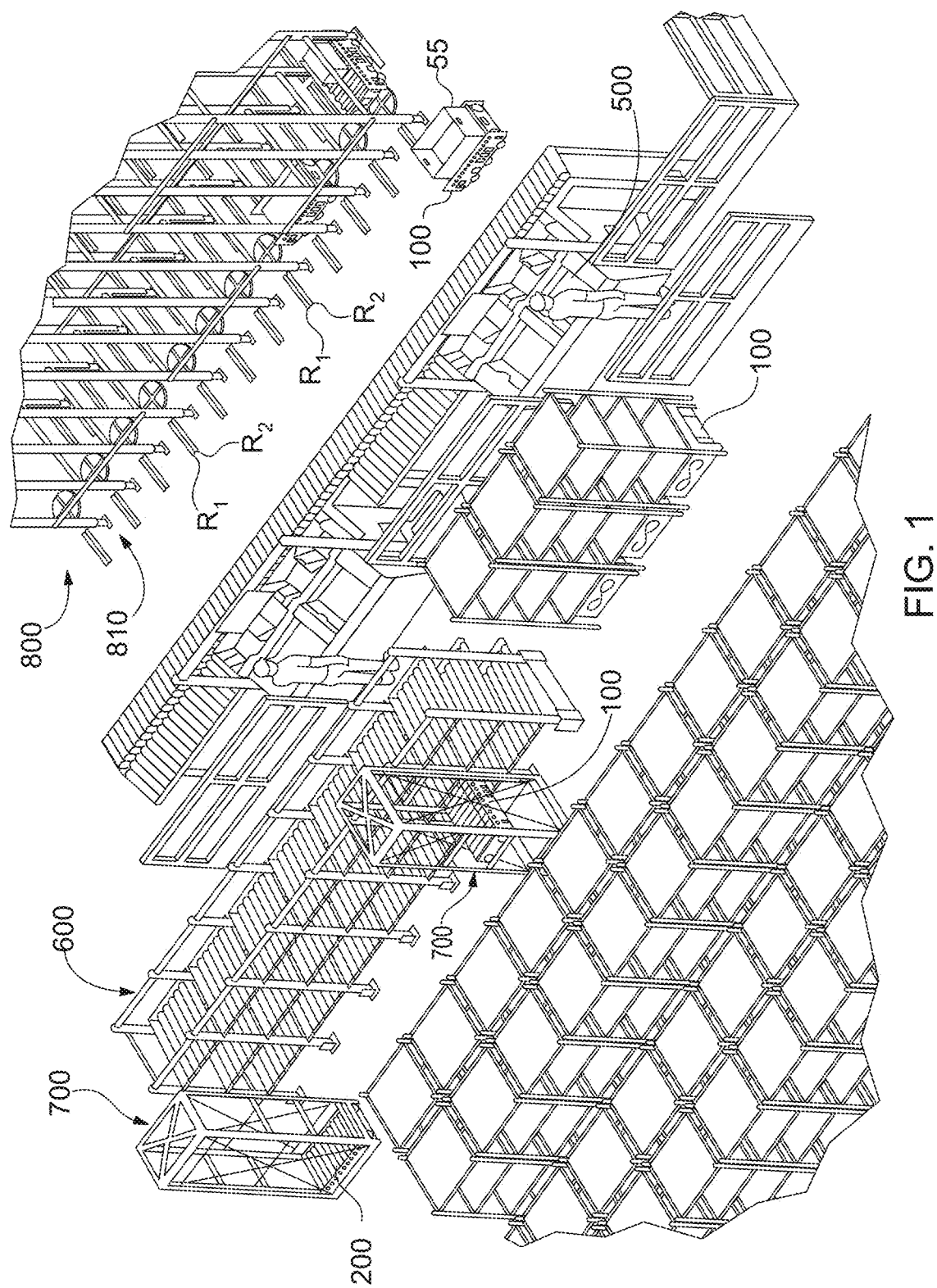
FIG. 1 is a perspective view of a material handling system.

While the systems and methods are described herein by way of example for several embodiments and illustrative drawings, those skilled in the art will recognize that systems and methods for performing respective subsets of inventory management tasks using corresponding functional accessory modules are not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the systems and methods for performing respective subsets of inventory management tasks using corresponding functional accessory modules defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for performing inventory management tasks in an inventory management system are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like may include a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts.

Referring now to the figures in general and to FIG. 1 specifically, an apparatus for sorting or retrieving items is designated generally 10. The apparatus 10 includes one or more mechanisms for delivering items to and/or retrieving items from one of a plurality of locations, such as storage areas located in racks 800 or flow racks 600. The delivery mechanism may include one or more vehicles 100 that transport items. For instance, optionally, the vehicles may retrieve items from storage locations 820 in the racks 800 and deliver the items to a workstation 500 where an operator can retrieve the item from the vehicle. The vehicle may optionally return to a storage area in the rack to store any remaining items that were not retrieved by the operator. The vehicle can then advance to another storage area to obtain the next item to be retrieved. In this way, the system may include a mechanism for continuously storing and retrieving items to/from the various storage areas so that the items can be presented to an operator. Optionally, a guide, such as a track, may be positioned adjacent the rack so that the vehicle may climb the rack vertically to retrieve an item from the rack. Optionally, the system may include a moveable rack 700 that is configured to be transported by the vehicles. The vehicles may transport the moveable rack into position adjacent a storage rack. The vehicle may then climb the rack vertically to transfer items between the vehicle and a storage location in the storage rack.

It should be understood that various items and subassemblies of the overall system can be used alone or in combination with material handling systems having different structure or operation to the system illustrated in the Figures and described below.

Figure 6:
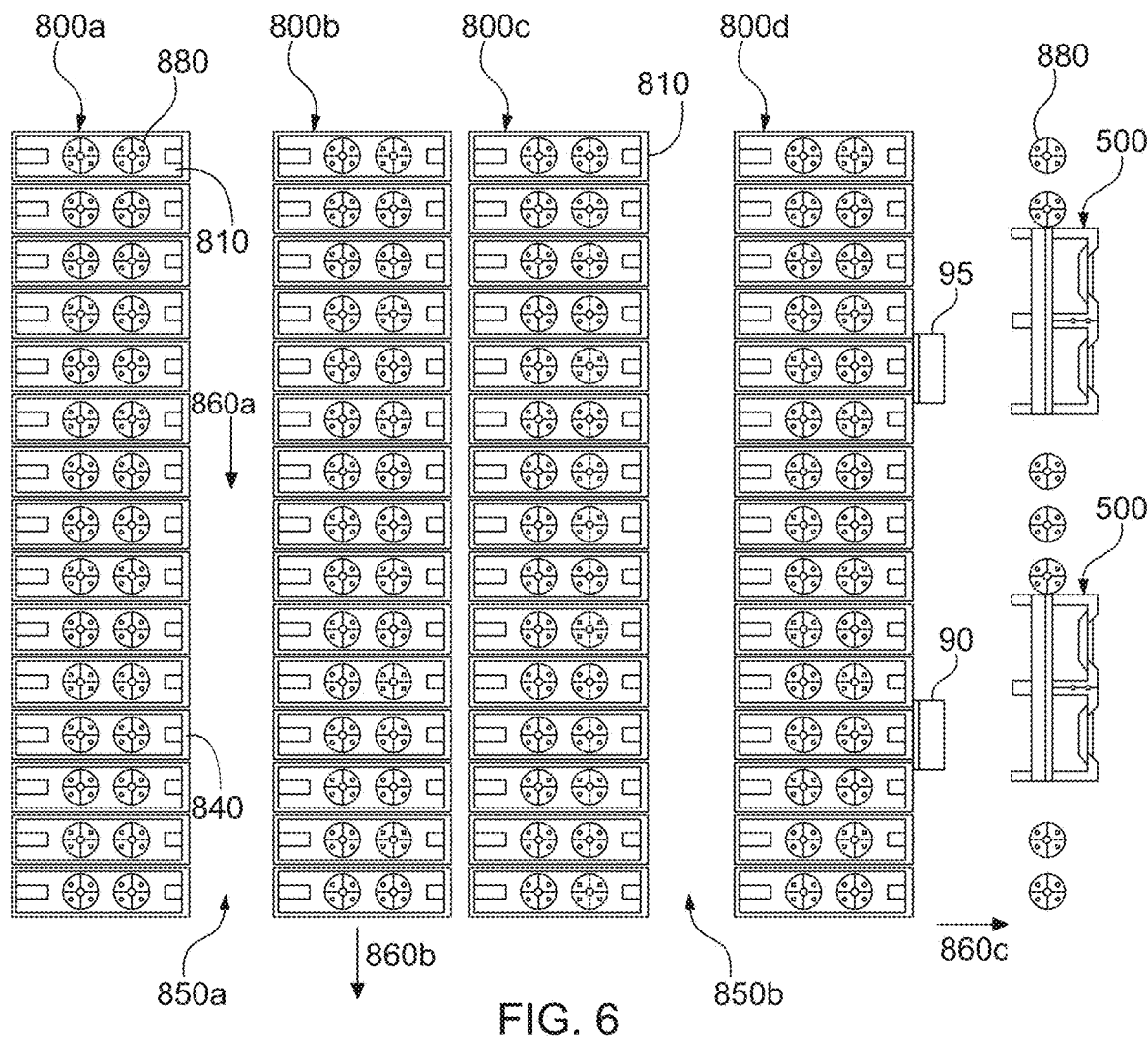
FIG. 6 is an enlarged fragmentary perspective view of a rack portion of the material handling system illustrated in FIG. 1.
Figure 7:
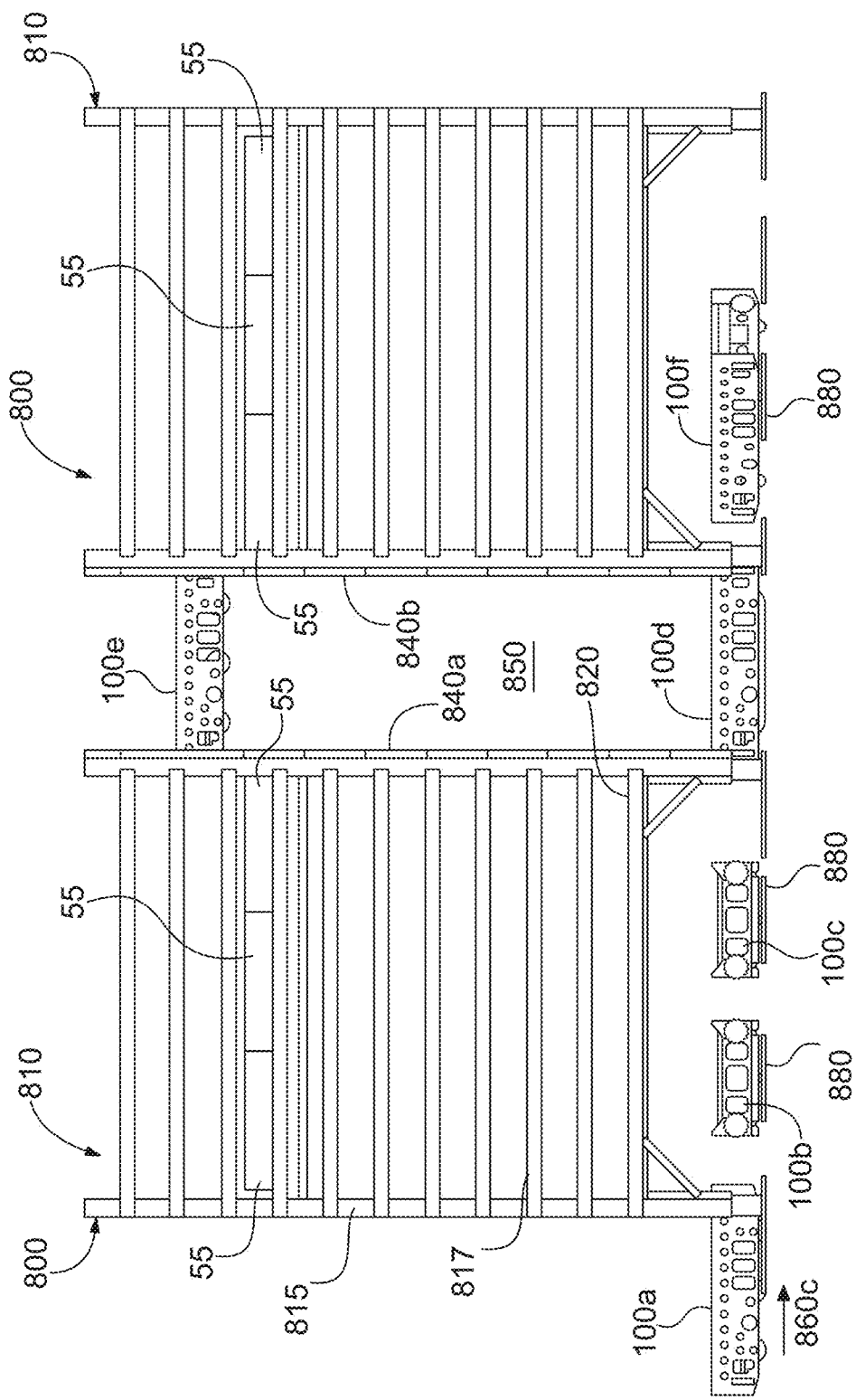
FIG. 7 is a front elevational view of an aisle of a rack system of the material handling system illustrated in FIG. 1.

As illustrated in FIGS. 1 and 7, the material handling system may optionally incorporate one or more storage racks 800. Each storage rack may include a plurality of storage locations 820. Optionally, the storage locations may be arranged into one or more vertical columns 810. For instance, FIG. 1 illustrates a plurality of racks 800 and each rack may include a plurality of columns 810, each of which includes a plurality of storage locations. The items that are handled by the system may be stored directly in the storage locations. Alternatively, the items may be stored in bins or totes 55 and the storage locations 820 may be configured to store the totes 55 as shown in FIGS. 1 and 6-9. Accordingly, it should be understood that unless stated otherwise in the following description, when a tote is mentioned, the term tote is broad enough to include a container for containing one or more items as well as simply being an item that is not necessarily contained in a container. Although the present system is described as using totes, it should be understood that any of a variety of storage mechanisms can be used, such as pallets or similar platforms.

Vehicles

Figure 2:
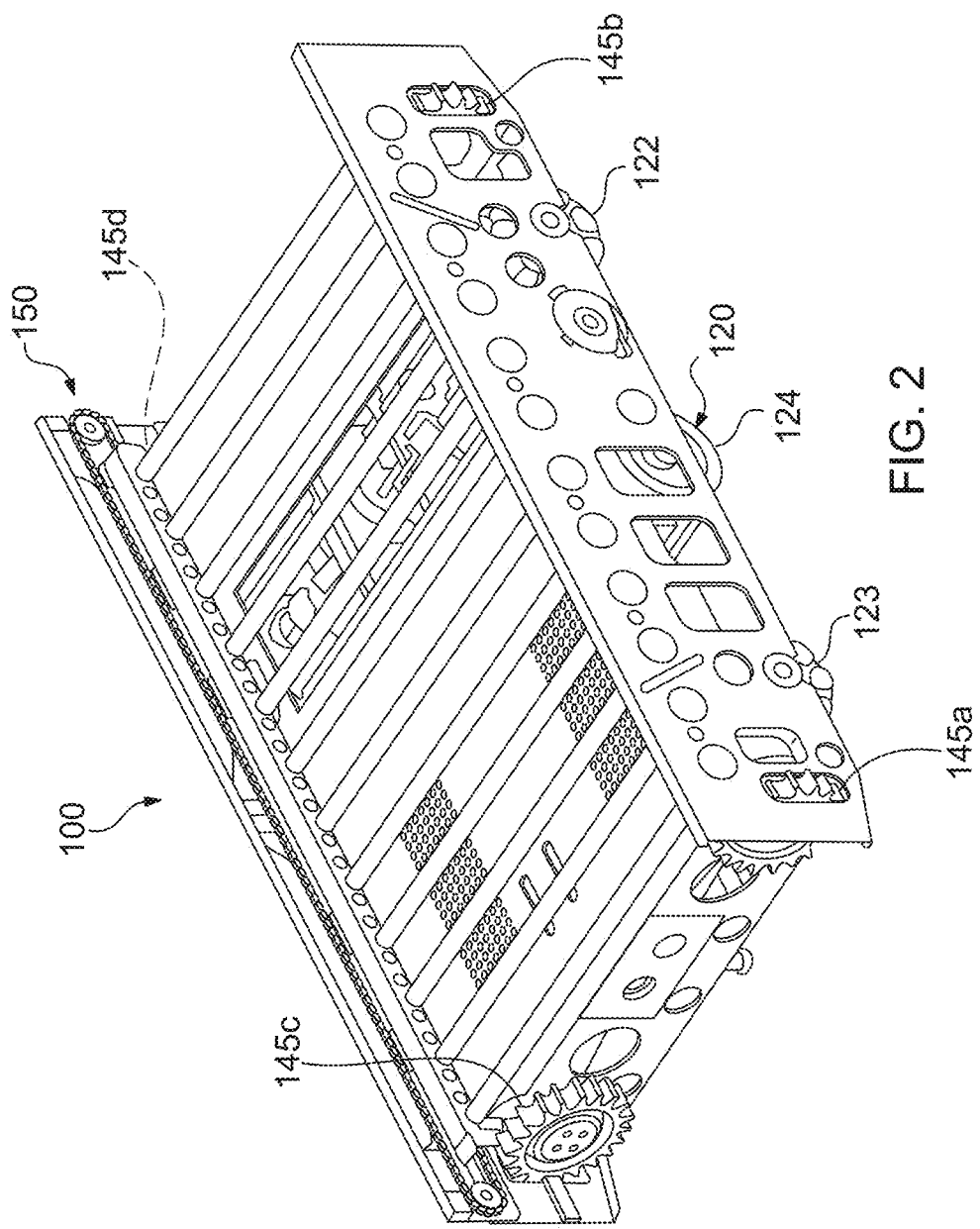
FIG. 2 is a perspective view of an automated guided of the material handling system illustrated in FIG. 1.

FIG. 2 illustrates details of one of the vehicles 100 that are shown in FIG. 1. As noted above, if the system incorporates vehicles, the structure of the vehicle may vary. Accordingly, it should be understood that each of the vehicle's features discussed below are optional features that may be varied or eliminated depending on the application.

The vehicles 100 may be autonomous systems that include an onboard power supply for driving the vehicle. The vehicles may also include a communication system for wirelessly receiving and transmitting control signals between each vehicle and a control element, such as the central controller 450. In this way, the vehicle may receive control signals regarding the location for retrieving an item and the location to which the vehicle is to deliver the item.

The vehicle illustrated in FIG. 2 includes a horizontal drive assembly 120 for driving the vehicle 100 in a horizontal direction. The horizontal drive 120 may be configured to drive the vehicle along a track or along an open horizontal surface, such as a floor. For instance, one option for a horizontal drive includes a plurality of rotatable elements, such as wheels or rollers. One or more drive mechanisms may be provided for turning the rotatable elements. Additionally, the rotatable elements may turn from side to side to steer the vehicle.

Figure 3:
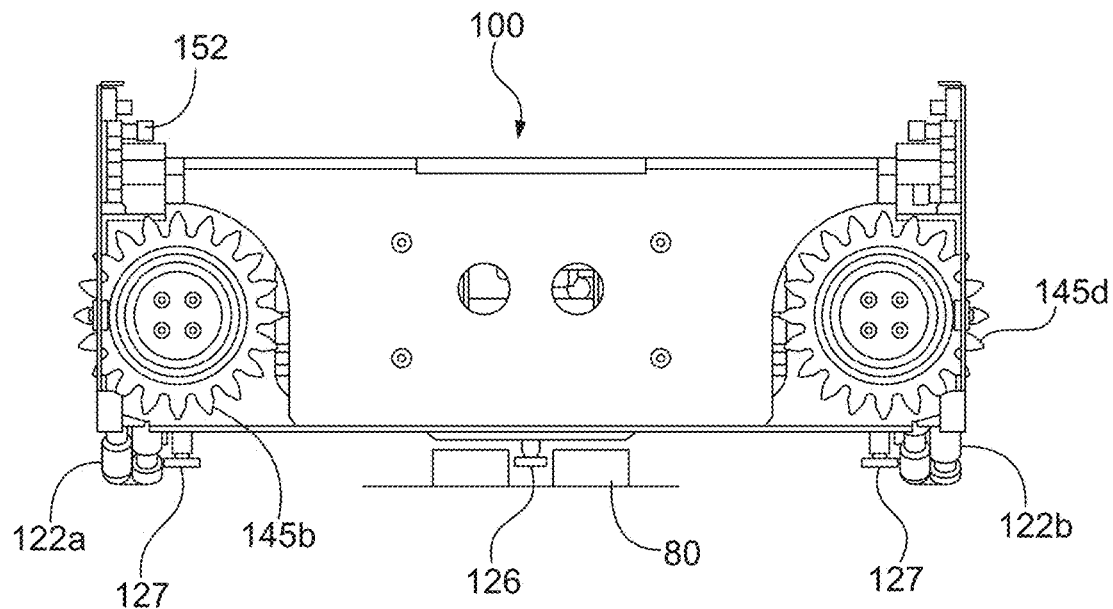
FIG. 3 is an end view of the vehicle illustrated in FIG. 2.
Figure 4:
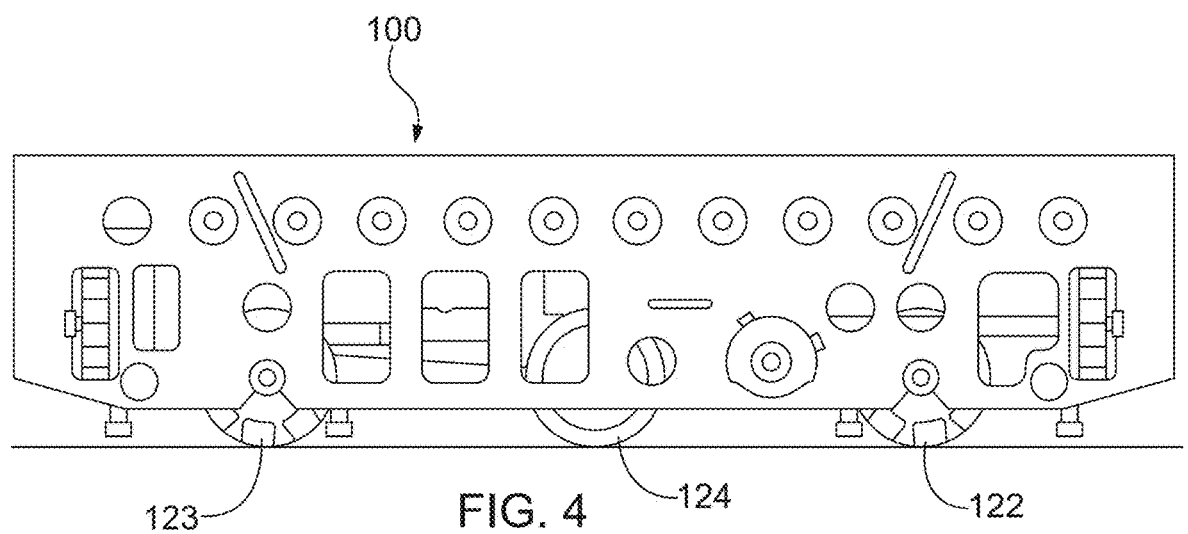
FIG. 4 is a side elevational view of the vehicle illustrated in FIG. 2.
Figure 5:
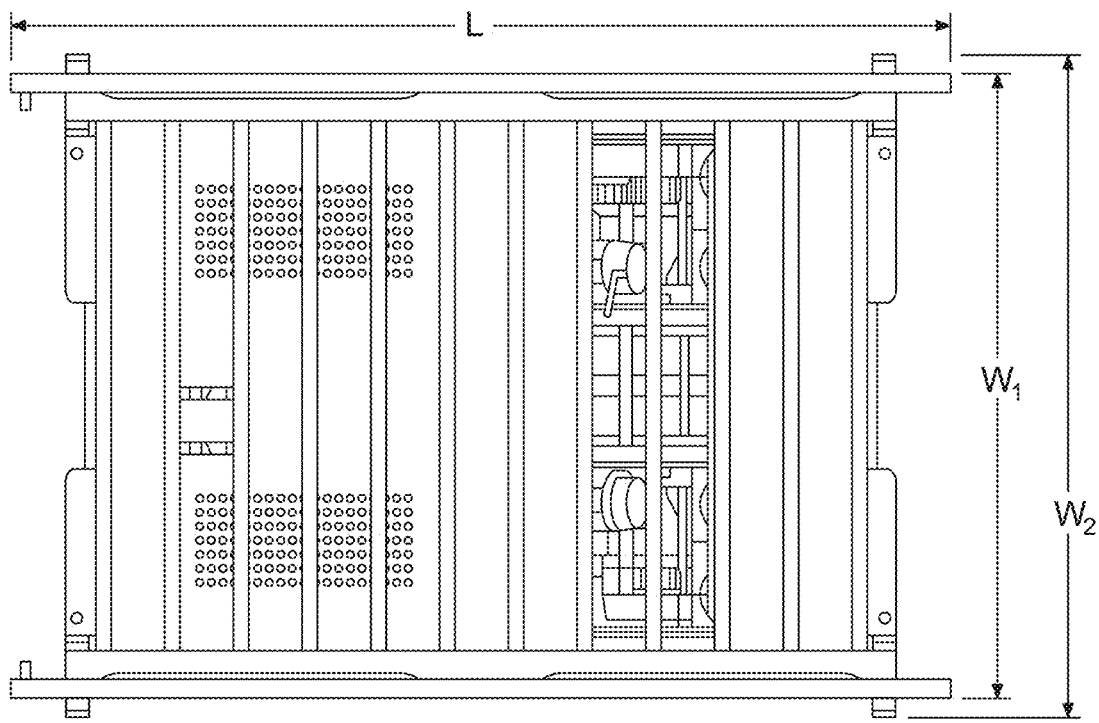
FIG. 5 is a plan view of the vehicle illustrated in FIG. 2.

Alternatively, as illustrated in FIGS. 3-5, the vehicle may have a horizontal drive 120 formed of a plurality of rollers 122, 123, 124 that are rotatable around a first axis, such as around an axle. Additionally, the rollers 122, 123, 124 may be constrained to rotation about a single axis. For example, in the embodiment illustrated in FIGS. 3-5, the horizontal drive 120 includes a pair of central rollers 124 and first and second sets of outer rollers 122, 123. The first set 122 is positioned forwardly of the central rollers while the second set of rollers 123 is positioned rearwardly of the central rollers 124. The outer rollers 122, 123 may include rollers spaced apart along the length of a horizontal axle so that each set of outer rollers includes a first roller 122a on one side of the vehicle and a second roller 122b on an opposite side of the vehicle as shown in FIG. 3. Additionally, as shown in FIG. 3, each set of outer rollers may include a pair of rollers 122b on each side of the vehicle.

As noted above, the vehicle 100 may have any of a variety of steering mechanisms for controlling the direction of travel of the vehicle. For example, an optional steering mechanism is a zero-turn mechanism that can turn the vehicle without substantially moving forwardly. Optionally, the zero-turn mechanism provides a means for turning the vehicle about a vertical axis extending through the vehicle.

The zero-turn mechanism comprises a linkage that allows the wheels or rollers on one side of the vehicle to rotate at a different speed than the wheels or rollers on the opposing side of the vehicle. Optionally, the linkage allows the wheels or rollers on one side of the vehicle to rotate in different directions than the wheels or rollers on the opposing side of the vehicle. In this way, by varying the speed and/or rotational direction of the wheels on one side of the vehicle relative to the speed and/or rotational direction of the wheels on the opposing side of the vehicle, the zero-turn mechanism changes the direction of travel to steer the vehicle.

Optionally, the system may also include one or more guides 880 to guide or align the vehicles as they travel. For instance, referring to FIG. 9, the guide 880 may include a channel or groove and the vehicle may include a corresponding guide element that cooperates with the guide 880 to control movement of the vehicle 100. One example of a guide element is a follower 126. The follower may be any element configured to engage with or cooperate with the guide 80. In the present instance, the vehicle 100 includes a central follower 126 that includes a rotatable element such as a bearing that rotates about a vertical axis. The central follower 126 engages the channel in the guide 880 to constrain horizontal movement of the vehicle.

Optionally, the vehicle may also include one or more lateral guide member 127. The lateral guide members 127 may cooperate with an outer surface of the guide 880 to constrain movement of the vehicle. For instance, guides 880 may comprises circular guides having a circumferential surface for guiding the rotation of the vehicles. The vehicle may have a pair of lateral guide members 127 spaced apart from one another a distance equal to the diameter of the circumferential surface of the guide. In this way, the lateral guides 127 engage the circumferential surface of the guide to constrain the vehicle to rotational motion.

In addition to the horizontal drive mechanism 120 the vehicle may also include a vertical drive mechanism 140 for driving the vehicle 100 vertically within the rack 20. In particular, as noted above, the system may include a guide mechanism such as a track 840 that is disposed adjacent the rack 20. The vertical drive mechanism 140 may be configured to cooperate with the vertical guide mechanism 840 to drive the vehicle 100 vertically.

FIGS. 2-3 illustrate an exemplary vertical drive 140 that includes a plurality of rotatable gears 145, however, it should be understood that the vertical drive 140 may include any of a number of drive mechanisms for driving the vehicle vertically. Referring to FIG. 3, the vertical drive may include drive gear 145 that rotates about a horizontal axis that is transverse the horizontal axis of rotation of the horizontal drive mechanism 120. In particular, optionally, the vehicle includes a pair of drive gears 145 that are spaced apart from one another so that teeth of a first one of the gears 145*b* project outwardly from a first side of the vehicle and teeth of a second one of the gears 145*d* project outwardly from a second side of the vehicle as shown in FIG. 3. These first and second gears 145*b,d* may be synchronously driven. Additionally, as shown in FIG. 2, the vehicle may include two pairs of vertical drive elements that are spaced apart from one another along the length of the vehicle. In particular, optionally, the vehicle includes a first pair of vertical drive elements 145*a,c* at a first end of the vehicle and a second pair of vertical drive elements 145*b,d* at a second end of the vehicle.

Referring to FIGS. 1 and 6-7, the rack 20 may be configured so that the track 40*a* on one rack is spaced apart from the track 40*b* on a second rack a distance corresponding to the spacing between the first set of vertical drive elements 145*a* and the second set of drive elements 145*b*. In this way, the first vertical drive element 145*a* may cooperate with the first track 40*a* to drive the vehicle up the first track 40*a*, while the second vertical drive element 145*b* may cooperate with the second track 40*b* to drive the vehicle up the second track 40*b*. Optionally, the two vertical drive elements 145*a,b* are synchronously driven so that the vehicle maintains a horizontal orientation as the vehicle moves from horizontal movement to vertical movement.

As described in U.S. Provisional Patent application No. 62/886,602, the entire disclosure of which is hereby incorporated by reference, the vertical drive 140 may optionally be configured so that vertical drive has a width that remains substantially constant as the vehicle transitions from horizontal movement to vertical movement. In this way, the vertical drive 140 need not telescope of extend outwardly to transition from horizontal driving to vertical driving. For example, referring to FIGS. 2-3 forward climbing gears 145*b* and 145*d* each have a horizontal axis of rotation and the spacing between the horizontal axis of rotation of drive member 145*b* is fixed relative to the horizontal axis of rotation of drive member 145*d* while the vehicle is moving horizontally and while the vehicle is climbing.

The vehicle may also include an optional transfer mechanism for transferring items between the vehicle and a destination, such as a storage location.

For instance, the transfer mechanism 150 may be operative to transfer an item between a platform surface of the vehicle and one of the plurality of destination areas 820. As shown in FIG. 2, the platform surface is optionally defined by the exterior surfaces of a plurality of rollers.

The transfer mechanism 150 may be any of a variety of mechanisms for loading items onto the vehicle and for unloading items from the vehicle into one of the storage areas. Additionally, the transfer mechanism 150 may be specifically tailored for a particular application. In the present instance, the transfer mechanism 150 comprises one or more displaceable element(s) configured to engage an item stored at a storage location and pull the item onto the vehicle. More specifically, in the present instance, the vehicle includes one or more displaceable element(s) configured to move toward a tote in a storage location and releasably engage the tote. After the displaceable element(s) engage the tote, each displaceable element is displaced away from the storage location, thereby pulling the tote onto the vehicle 100.

The displaceable element of the transfer mechanism may any of a variety of items, such as a bar, rod, or another element configured to engage an item, for example, a tote. For example, referring to FIGS. 2-3, the transfer mechanism 150 may include one or more displaceable pins 152. Additionally, the transfer mechanism may include a drive element for displacing the pins 152. For instance, optionally, the transfer mechanism 150 includes two drive elements in the form of endless carriers such as a drive belt or as shown drive chains 154. Optionally, each pin 152 projects or extends inwardly toward the longitudinal center line of the vehicle. The transfer mechanism is preferable configured to cooperate one of the totes to releasably engage the tote. For example, in the present instance, the pins 152 are configured to mate with a recess on the tote so that the transfer mechanism can engage the tote. However, it should be recognized that the transfer mechanism may include any of a variety of elements for engaging items to be transferred onto of off of the vehicle.

The vehicle includes one or more drive elements for driving the transfer mechanism. Optionally, the vehicle includes one or more motors that drive the transfer mechanism 150. For instance, one or more motors of the vehicle drive system may drive the chains 154 to selectively move the chains and pins 152 toward or away from storage locations.

As the vehicle approaches a storage location to retrieve a tote, the chains may drive the displaceable pins 152 toward the storage location so that the pins underlie a groove or notch in the bottom of the tote. The vehicle travels a small distance upward until the pins 152 are disposed with the groove or notch of the tote. The chain 154 then reverses so that the pins 152 move away from the storage location. Since the pins engage the tote within the notch, when the pins move away from the storage location, the pins pull the tote onto a surface of the vehicle. In this way, the transfer mechanism 150 is operable to retrieve items from a storage location. Similarly, to store an item in a storage location 820, the chains 154 of the transfer mechanism 150 drives the pins 152 toward the storage location until the item is in the storage location. The vehicle then moves downwardly to disengage the pins from the tote, thereby releasing the tote.

In this instance, as seen in FIG. 7, two or more totes, such as totes 55, may be coupled and decoupled from one another using mating connectors. Optionally, totes 55 may be coupled and decoupled from one another through a series of lifting and separating movements implemented by movement of the vehicle 100. Optionally, the transfer mechanism 150 may be actuated to pull a forward facing ("lead") tote onto a surface of the vehicle so as to be fully supported by vehicle 100. If the totes are releasably connected, this pulling motion advances the trailing tote (i.e., the one that is immediately behind the lead tote) into the aisle facing location. Optionally, the vertical drive mechanism of vehicle 100 is then operated to drive the vehicle 100 vertically to uncouple the lead tote from the trailing tote(s). Once decoupling is completed, the drive system may be actuated again to center the tote upon the vehicle 100.

The vehicle 100 may include a separate drive element for driving the transfer mechanism 150. Alternatively, the transfer mechanism may be interconnected with one of the horizontal or drive elements of the vehicle. Specifically, the transfer mechanism may be connected with one of the drive systems so that the drive system is selectively operable between driving the vehicle and driving the transfer mechanism.

For instance, the transfer mechanism may optionally be connected with one of the horizontal drive systems with a selectable connection so that in a first orientation the drive system drives the vehicle horizontally and in the second orientation the drive system drives the transfer mechanism. The optional clutch mechanism may be selectively engaged and disengaged to initiate and terminate transmission of power, respectively, from the motor(s) of the horizontal drive system to the transfer mechanism, whereby the second drive system may be operated independently of the transfer mechanism. In this instance, the clutch mechanism may be configured as two clutch sub-assemblies which are symmetrically arranged relative to a longitudinal centerline of vehicle 100.

The vehicle 100 may be semi-autonomous or, alternatively, fully autonomous. In the latter regard, a multitude of non-contact systems have been proposed for the purpose of continuously determining the actual position of an automated guided vehicle in absolute coordinates, and resetting navigational parameters (i.e., X, Y, and heading) to null out accumulated errors, thereby re-referencing the vehicle. Any of these may be utilized in the implementation of position referencing for automated guided vehicles in an inventory management system consistent with embodiments of the present disclosure. Such referencing systems can be ultrasonic, RF, or optical in nature, with ultrasonic and optical being especially suited to indoor scenarios. Of these latter two categories, optical systems are generally more accurate and therefore more widely employed in commercial practice.

Exemplary position sensing systems utilize a scanning mechanism that operates in conjunction with fixed-location references strategically placed at pre-defined surveyed sites. Such scanning mechanisms may include scanning detectors with fixed active-beacon emitters, scanning emitter/detectors with passive retroreflective targets, scanning emitter/detectors with active transponder targets, and rotating emitters with fixed detector targets.

In one or more illustrative embodiments consistent with the present disclosure, the vehicles may optionally rely on a scanning laser triangulation scheme (SLTS) to provide positional updates to an onboard dead-reckoning system of the vehicle. A laser emitter rotating at, for example, two rpm illuminates passive retroreflective barcode targets affixed to walls or support columns at known locations on the order of fifteen meters away from the vehicle. The barcodes are used to positively identify the reference target and eliminate ambiguities due to false returns from other specular surfaces within the operating area. An onboard computer of each vehicle calculates X-Y positional updates through simple triangulation to null out accumulated dead-reckoning errors.

Alternatively, each vehicle 100 may optionally utilize retroreflective targets, distributed throughout the operating area, in a manner which allows both range and angular orientation to be determined by each vehicle. For example, a servo-controlled rotating mirror on the vehicle may optionally pans a near-infrared laser beam through a horizontal arc of 90 degrees at, for example, a 20-Hz update rate. When the beam sweeps across a target of known dimensions, a return signal of finite duration is sensed by the detector. Where the retroreflective targets are all the same size, the signal generated by a close target will be of longer duration than that from a distant one. Angle measurement is initiated when the scanner begins its sweep from right to left, where detection of the reflected signal terminates the timing sequence.

As yet another position reference technique which may be employed in the vehicle is a laser-based scanning beacon system computes vehicle position and heading using cooperative electronic transponders with passive reflectors. Such a scanner mechanism includes a rotating mirror attached at, for example, a 45-degree angle to the vertical shaft of an incremental optical encoder. To improve azimuthal accuracy, optionally a timer interpolates between encoder counts. The fan-shaped beam diverges vertically at, for example, a four-degree spread angle, to ensure target detection at long range while traversing irregular floor surfaces. Each target is uniquely coded, and many (e.g., 32) targets can be processed in a single Scan, with vehicle X-Y position calculated every 100 milliseconds.

In one or more embodiment, each vehicle may maintain, in memory, an internally stored map of its own position within a facility. In addition, each vehicle provides signals to the central controller that may include data such as position, speed, angular orientation in the plane of travel, and a selected path of travel data to other vehicles in the facility. The vehicle may also include a receiver so that the vehicle can receive such data regarding other vehicles. The vehicle may receive such data regarding other vehicle either directly from other vehicles or from a central controller. Using the vehicle data, each vehicle may maintain a dynamically updated map which reflects the position of all vehicles in the particular zone(s) of an inventory management facility to which that vehicle has been assigned. When dynamically updated position data is available locally at each vehicle, a task may be assigned to a vehicle by a central controller 450, including the path segments taken by a vehicle to reach the location(s) where elements of the assigned task are to be performed may be selected by the vehicle.

Each vehicle may include a processor configured to execute steps of a navigation process stored in memory which cause the vehicle to follow a shortest path from a current location of the vehicle to a destination where the next subtask(s) of an assigned task are to be performed. In such embodiments, the central controller 450 need not be configured to execute traffic control and collision avoidance functions (unless a backup control scheme is desired) but, instead, the central controller 450 may be configured to transmit signals representative of instructions which identify the next task(s) to be assigned to each vehicle and which specify the various locations within the facility where those tasks are to be performed. The vehicles, on the other hand, may be configured to transmit signals to the controller which are representative of task assignment acknowledgements, position updates, status updates (e.g., sub-task completed or in process, current power status, etc.), and other information which the controller may require to assess the relative ability of the vehicles to perform tasks awaiting assignment.

In a fully autonomous scheme according to one or more embodiments, each vehicle may alternatively utilize a local processor to determine speed and direction of movement from sensed indicia placed on an underlying support surface in one or more zones of an inventory management facility, to exchange that positional data with other vehicles within the facility, and to maintain a dynamically updated, local map to achieve a form of decentralized traffic control in manner similar to that described above using other positional sensing approaches.

In semi-autonomous configurations of vehicles 100, also referred to as automatic guided vehicles (AGVs), a central controller, such as controller 450, provides traffic control functions needed, for example, to prevent collisions of the vehicles with one another and/or with any potential obstructions to vehicle movement which may be present in the one or more zone(s) of a facility to which a subset of vehicles are assigned. In such embodiments, the controller 450 receives current position and bearing data in the form of update signals transmitted from the vehicles 100. The received position and bearing data are compared with estimates that the controller has derived from prior speed and heading instructions transmitted by the controller to the vehicle. Based on the comparison, the controller 450 may determine that corrections to one or more of the velocity and the direction of one or more vehicles that is needed to prevent a collision and, if so, transmit those instructions to the vehicle(s).

In one or more semi-autonomous embodiments, each vehicle 100 may include a reader for reading indicia placed on a surface upon which the vehicle is traveling and/or in positions within access columns aligned with the array of storage areas 820 (see FIG. 1). In some embodiments, each indicium of a first group of indicia corresponds to a unique location to form a grid of locations. These locations may be stored in a data table in a memory accessible to a processor of the vehicle, of the central controller 450, or a both. By following a path designed to intersect with a particular sequence of these indicia, each vehicle may transmit an identifier of an indicium as it passes over it and confirm it to controller 450 whereupon a semi-autonomous guiding of the vehicle is achieved via instructions transmitted by the controller to the vehicle. From this information and other data reported by each vehicle, controller 450 can confirm the speed, direction, and path of movement for each vehicle. In one or more embodiments, controller 450 utilizes speed and directional data to enforce collision avoidance policies, to assign inventory management tasks according to the location and power reserve status of each vehicle and, in the interest of safety, to maintain an appropriate distance from any personnel permitted in the area.

Additional indicia may be affixed, within the access columns or to stored totes themselves, at positions adjacent to each storage locations. Here, each indicium may bear include a unique bar code, and the reader on each vehicle 100 may scan the area around the storage location at which an item is to be delivered or retrieved. The data that the central processor 450 has regarding the path that a vehicle 100 has to follow and the data regarding the distance the vehicle has traveled based on the data regarding the rotation of the drive motor may be sufficient to determine whether the vehicle 100 is positioned at the appropriate storage location within the storage areas. Nonetheless, indicia adjacent the storage areas permits a redundancy check of the location of the vehicle before an item is discharged into or received from the appropriate storage location. Therefore, the scanner may operate to scan and read information regarding the storage location at which the vehicle is stopped. If the scanned data indicates that the storage location is the appropriate storage location, then the vehicle discharges its item into the storage location. Similarly, the vehicle may have a second reader for reading indicia adjacent the rearward edge of the vehicle. The second reader may be used in applications in which the system is set up to utilize a first series of storage locations along the forward side of an access column and a second series of storage locations along the rearward side of an access column, as shown in FIG. 1.

In some embodiments, functionality for autonomous or semi-autonomous guidance of the vehicles 100 may be integrated into one or more functional accessory. Such an approach may be beneficial where precise position sensing is required in some zones within an inventory management facility, but a less precise position sensing approach may be acceptable in other zones. For example, in embodiments such as that depicted in FIG. 1, functional accessories 700 are depicted as serving a supporting role to maintain a necessary supply of items to operators at a workstation.

In the foregoing description, the vehicles have a vertical drive 140 that is dimensioned and arranged to interact with tracks disposed adjacent storage areas 820 of racks 800 as discussed further below. The drive gears effect the raising or lowering of a vehicle, depending upon the direct of rotation of motor 230. As well, the functional accessories may incorporate tracks that cooperate with the vertical drive so as to permit a vehicle to raise and lower a functional accessory with which it is associated.

In some embodiments, the processor of each vehicle controls the operation of the vehicle in response to signals received from the central processor 450. Additionally, the vehicle includes a wireless transceiver so that the vehicle can continuously communicate with the central processor as it travels along the track. Alternatively, in some applications, it may be desirable to incorporate a plurality of sensors or indicators along paths which the vehicles may traverse. The vehicle may include a reader for sensing the sensor signals and/or the indicators, as well as a central processor for controlling the operation of the vehicle in response to the sensors or indicators.

As shown in FIG. 1, a material handling system 10 may include a number of different stations or areas. For instance, the system 10 may include a large number of storage locations arranged in numerous racks 800. The racks may accommodate thousands or tens of thousands of storage locations 820.

Autonomous Storage

Referring again to FIGS. 1 and 6, the system may include a plurality of racks 800 that optionally may be positioned to form rows or aisles 850. For instance, a first rack 800*a* may be spaced apart from a second rack 820*b* so that an aisle 850*a* is formed between the two racks. In particular, the first rack 820*a* may be substantially parallel to the second rack to form an aisle having a substantially uniform width. Additionally, the system may include a plurality of racks forming a plurality of aisles 850. Although the aisles 850 are illustrated in FIG. 6 as being parallel, it should be understood that if the system incorporates a plurality of racks 800, the racks may be arranged in a variety of configurations and if the system includes a plurality of aisles 850, the aisles need not be parallel.

One of the inventory management tasks assigned to a vehicle 100 may be to retrieve items from the storage locations 800. This task can be viewed as a series of sub-tasks which include exiting the current or starting location of the vehicle, traversing a path which takes the vehicle between the starting location to an intermediate destination adjacent a point of entry into the array of storage locations and, at the intermediate destination, aligning the vehicle 100 with the point of entry. As a further sub-task of the retrieval task, the aligned vehicle enters the array and maintains its alignment until it reaches the column within which the vehicle is positioned, is operated to climb, according to yet another sub-task, until it reaches a target one of the storage areas 820. As further sub-tasks of the retrieval process, a transfer mechanism of the vehicle is operated to retrieve an item, descend within the column until the vehicle rests upon a support surface, and then exit the array of storage location. As a final sub-task of the retrieval operation, the vehicle 100 proceeds along a path to an output station 500, where an operator can retrieve the item from the vehicle.

Optionally, the system includes an automated element for storing and retrieving totes from the storage locations. One such automated element is an autonomous vehicle. For example, as discussed further below, the automated element may include a plurality of autonomous vehicles 100. Additionally, the automated vehicles 100 may be configured to transport the totes 55 to workstations 500. At the workstation 500, one or more items may be removed from a tote on one of the vehicles 100. In one embodiment, a human operator may remove an item from the vehicle. However, it should be understood that an automated mechanism may remove the item from the vehicle. Accordingly, it should be understood that the operator that handles items at the workstation(s) 500 may be a human operator or an automated mechanism or a combination of the two.

The system 10 and/or various components of the system may be controller by a central controller 450, such as a microcomputer. The central computer may receive signals from various elements, such as sensors and control various aspects of the system based on signals received from the various components. The central controller may also store data regarding the location of various items to be retrieved from the system. Additionally, the central controller may include data regarding the identification of items to be retrieved, such as a number of items to fill customer orders, as well as the quantify of such items. In this way, the central controller may control and coordinate the operation of various elements to schedule the retrieval and processing of a variety of items from the storage locations.

FIG. 6 is a plan view depicting a part of an inventory management system 800, which may form part of the system shown in FIG. 1 and utilizes autonomous vehicles 100 to transfer containers 55 of inventory items back and forth between a picking area and a vertical array of storage locations 820. The system may incorporate a plurality of vehicles 100 and the array of storage locations 820 as elements of an automated storage and retrieval system (AS/RS). The vehicles 100 may be configured in the same manner as the vehicles 100 described above. However, it should be understood that the vehicles may have modifications for different tasks within the system if desired.

In any event, and turning now to FIGS. 1 and 6-10, a system for storage and retrieval of items within an array of storage locations 820 will now be described in detail. Turning first to FIGS. 1 and 6, a plurality of automated guided vehicles 100*a* to 100*f* are depicted being operated within or about a rack structure 800. As in previously described embodiments, the vehicles perform various item replenishment and/or item retrieval tasks and in this instance, some of those tasks involve retrieving containers from or returning the containers (or totes) to storage locations 820.

As discussed above, the system may include a plurality of racks that are spaced apart to form one or more aisles 850. Optionally, a track 840 may be positioned along one or more of the racks. For instance, the track may be fixedly connected to the racks 800. Additionally, the track may be configured to guide vehicles vertically so that the vehicles may be conveyed up and down the column to the storage locations in the column. Additionally, it may be desirable to position a first track along a rack on one side of the aisle, such as along rack 800*a* and a second track along a rack on the opposite side of the aisle, such as along rack 800*b*. The vehicles 100 may be configured so that the vehicle travels in the aisle 850*a* traveling with one side of the vehicle travelling vertically along a track on rack 800*a* while simultaneously a second side of the vehicle travels vertically along a track on rack 800*b*.

Each column may be formed by a plurality of vertical posts 815. The posts may be arranged so that a plurality of vertical posts are aligned in a parallel relation on one side of the column and a plurality of posts may be arranged in parallel relation on a second side of the column opposing the posts on the first side, as shown in FIGS. 7-10. As shown in FIG. 7, the posts 815 on each side may be interconnected by a plurality of horizontal members 817 that extend along the depth of the column.

The horizontal members 817 may be separate elements solely providing structural support for the column. Alternatively, the horizontal members may also support items stored in the storage locations 820. For instance, the horizontal supports may be planar elements forming shelves so that the shelves form storage locations. However, it should be understood that the horizontal supports may be any of a variety of configurations. For instance, in the embodiment illustrated in FIG. 8, the horizontal members are L-shaped brackets 817 that form elongated horizontal ledges to support edges of the totes 55 along the depth of the storage location. The horizontal brackets may be spaced apart from one another up the height of the vertical legs 815 to form a column of vertically spaced apart storage locations 820.

The column 810 of rack 800 has a depth, which from the perspective of FIG. 7 is similar to the length of horizontal bracket 817. The column 810 have a depth that is at similar to the length of a tote 55 or greater. For instance, the column may have a depth sufficient to accommodate at least one tote. However, the tote may overhang into the aisle 850, so the column may have a depth that is slightly less than the length of a tote. Alternatively, the column may have a depth sufficient to accommodate a plurality of totes arranged end to end as shown in FIG. 7. In the example illustrated in FIG. 7, the racks are sufficiently deep so that each storage location 820 can accommodate three totes 55 aligned end to end, wherein each tote is approximately similar of the length of the vehicles 100.

As described above, the vehicle has a length and a width. As shown in FIG. 5, optionally the vehicle has a length "L" that is sufficiently greater than its width "W2". Referring to FIGS. 6-10, the rack 800 is configured so that each column 810 has a width that is significantly less than its depth. Specifically, the width of each column is similar to the width of the vehicle and the depth of the column is substantially greater than the length of the vehicle. Optionally, the column has a depth that is more than twice the width of the vehicle as shown in FIGS. 7 and 10. Additionally, the depth of the column may optionally be greater than the length of the vehicle.

FIG. 7 illustrates a plurality of vehicles in different orientations relative to the racks 800 and the storage locations 820. For instance, a first vehicle 100a is oriented for horizontal movement along path 860c, transverse the length of aisle 850. A second vehicle 100b is oriented for horizontal movement under the rack along path 860b that is parallel to the length of the aisle 850. Additionally, a third vehicle 100c is positioned within the aisle 850 to climb vertical tracks along the racks 800 on either side of the aisle. A fourth vehicle 100d is also positioned within the aisle and has climbed up the track 840a,b to a storage location 820 in an upper portion of the column 810. Finally, a fifth vehicle 100f is positioned under the rack 800 and is oriented at an intermediate position between the orientation of vehicle 100a and the orientation of vehicle 100b. In particular, the racks may be configured to facilitate the vehicles turning horizontally underneath the racks. The fifth vehicle 100f illustrates the vehicle in the process of turning under the rack from a first path to a second path.

As mentioned above, structure 800 is dimensioned and arranged such that the vehicles may enter and exit from various locations beneath the storage locations, allowing for flexibility in the installation of picking and/or replenishing stations. If the system utilizes one or more vehicles and one or more racks, the racks may be configured to allow the vehicles to travel under the racks 800 as well as being able to travel across or along one or more aisles that may be incorporated into the system. For instance, referring to FIG. 6, the vehicles may follow a path that moves along one or more path segments that may be parallel or transverse to the aisle. A first such path is designated as path 860a. Path 860a is within and parallel to the length of aisle 850a. A second such path is designated path 860b, which is parallel to the length of aisle 850a, but spaced apart from the aisle. Specifically, path 860b is located under rack 800b. Rack 800b may be configured to provide clearance for movement of the vehicle under the lowermost storage location 820 so that the vehicle may travel under the rack 800b along a path 860b that is parallel to the length of the aisle. A third path is designated 860c, which is transverse 860a and 860b. As shown in FIG. 6, path 860c is parallel to the depth of the column 810.

Figure 9:
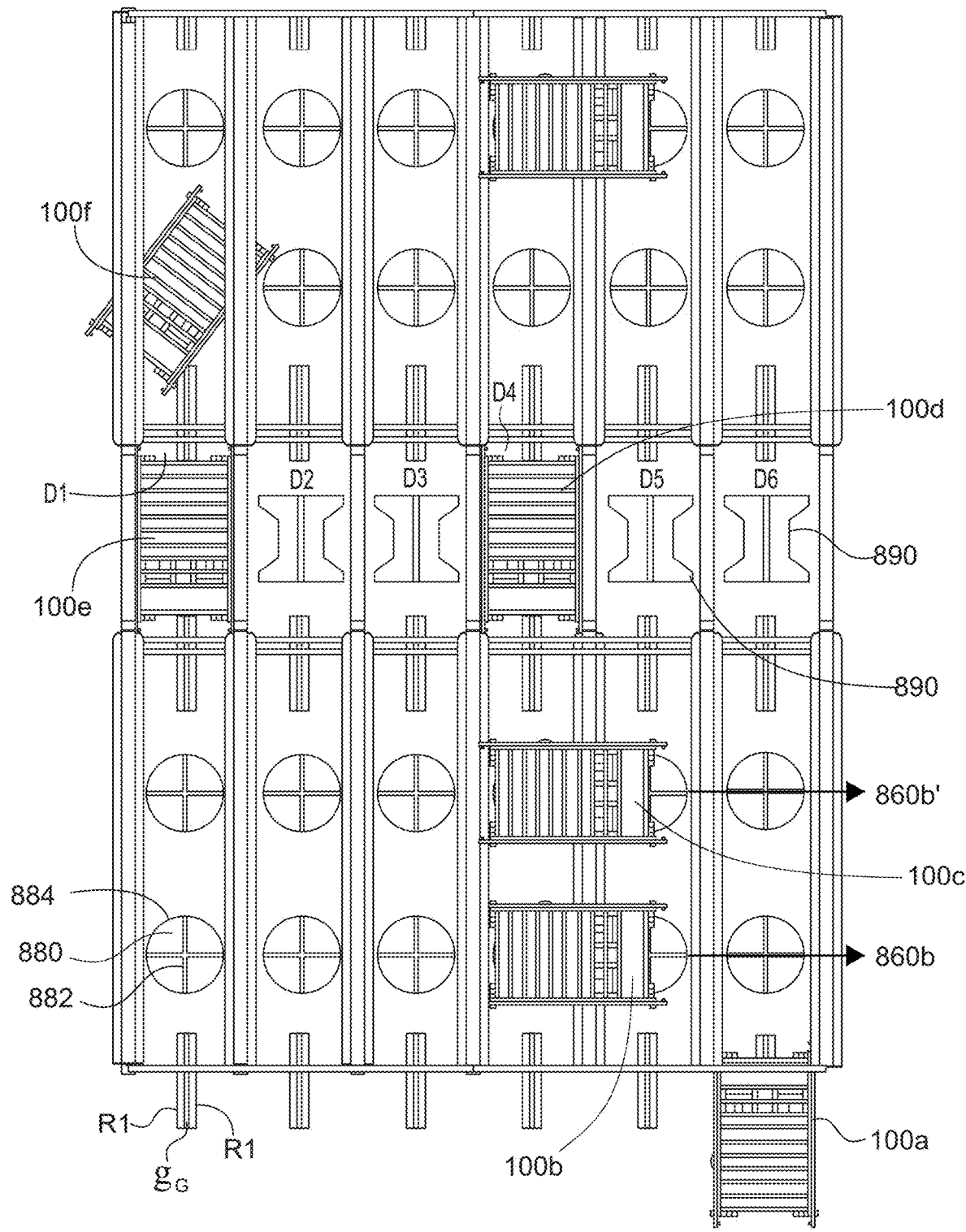
FIG. 9 is a plan view of the aisle illustrated in FIG. 7.
Figure 10:
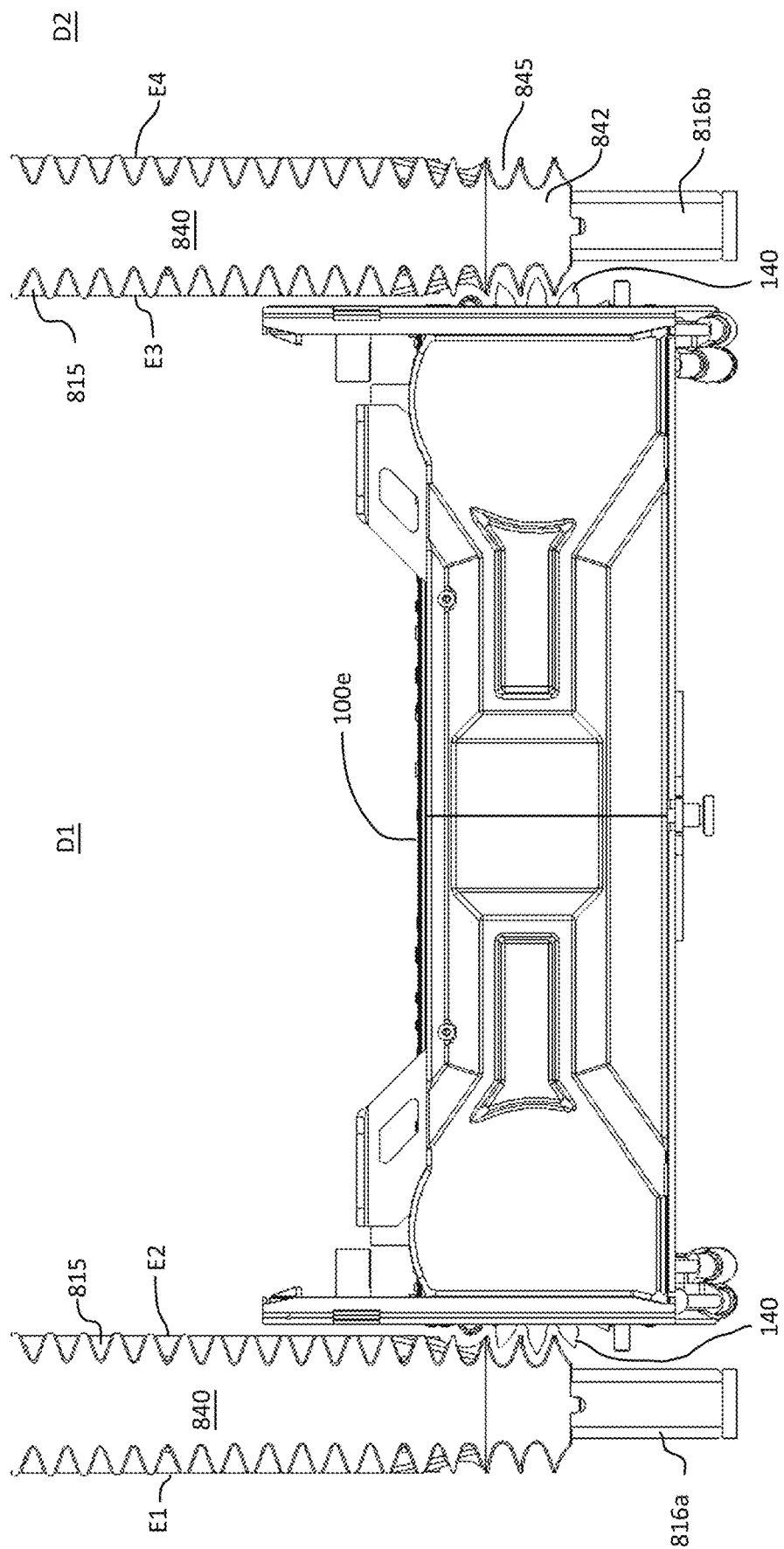
FIG. 10 is an enlarged fragmentary side elevational view of the aisle illustrated in FIG. 7.

Referring to FIGS. 7 and 9, the rack is optionally configured so that the columns of the rack have a depth sufficient to provide multiple paths under each column that are substantially parallel to the length of the aisle 850. Specifically, as shown in FIG. 7, the posts 815 adjacent the aisle 850 may be spaced apart from the posts 815 remote from the aisle to form an opening having a width that is greater than twice the width of the vehicle.

FIG. 9 illustrates vehicle 100b moving along path 860 that is parallel to the aisle and vehicle 100c moving along path 860' that is parallel to path 860. Preferably path 860 has a centerline that is spaced apart from the posts 815 adjacent the aisle that is greater than half the length "L" of the vehicle 100 (see FIG. 5). Similarly, preferably path 860 has a centerline that is spaced apart from the posts at the rearward edge of the column remote from the aisle 850 by a distance that is greater than half the length of the vehicle.

Optionally, the paths 860, 860' under the rack that are parallel to the aisle may be spaced apart to provide a gap to allow a first vehicle travelling along path 860 to pass a second vehicle positioned along path 860', such as a vehicle travelling in an opposite direction along path 860'. For instance, path 860 may be spaced apart from path 860' by a distance greater than the width "W2" of vehicle 100 (see FIG. 5).

Additionally, as discussed above, the vehicles may change direction by rotating about a vertical axis of rotation that passes through the vehicle. In particular, the axis of rotation may pass through the center of the vehicle. The columns 810 preferably have a depth sufficient to facilitate the vehicle rotating about the axis of rotation while the vehicle is positioned in the column under the rack. Specifically, each of path 860, 860' is preferably spaced apart from the posts 815 a distance greater than the distance from the axis of rotation to each of the corners of the vehicle.

When the vehicle turns under the rack 800, the vehicle may turn in any of a variety of angles. Optionally, the vehicle may turn in increments of 90 degrees. In particular, optionally, the vehicle turns either 90 degrees or 270 degrees after exiting the aisle so that the vehicle travels parallel to the aisle under the rack after climbing the track in the aisle.

Figure 8:
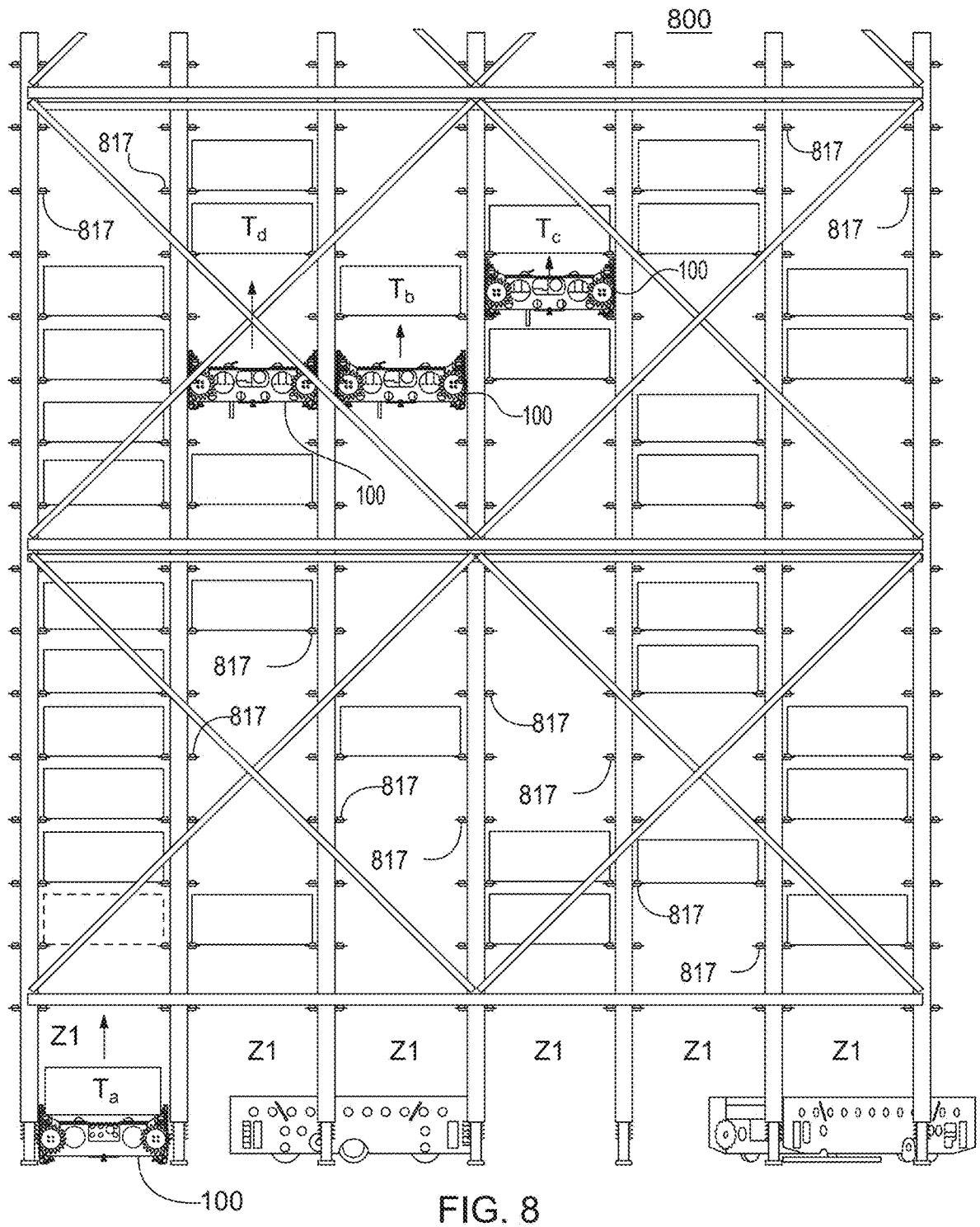
FIG. 8 is a side elevational view of the aisle illustrated in FIG. 7.

FIG. 8 is a side elevation view depicting the rack structure 800 that includes a plurality of columns 810a-810f populated within a number of containers or totes, including totes $T_a$, $T_b$, $T_c$, and $T_d$. A plurality of vehicles operating to perform various item replenishment and/or item retrieval tasks as part of the inventory management system. Vehicle 100a is shown having entered the leftward most drive column 810a. In this regard, and with reference now to FIG. 9, it will be seen that the structure 800 may incorporate an array of parallel guide rails, as rails R1 and R2, which define a gap $g_G$ between them. The gap is dimensioned and arranged to receive corresponding alignment structures on the vehicles to enable entry, exit and reorientation of the vehicles without damage to each other and the rack structure as discussed further below.

Optionally, the system may also include one or more guides 880 to guide or align the vehicles as they travel. For instance, referring to FIG. 10, the guide 880 may include a channel or groove and the vehicle may include a corresponding guide element 127 that cooperates with the guide 880 to control movement of the vehicle 100. One example of a guide element is a follower 127. The follower may be any element configured to engage with or cooperate with the guide 880. In the present instance, the vehicle 100 includes a central follower 126 that includes a rotatable element such as a bearing that rotates about a vertical axis. Optionally, the follower 126 includes a shaft so that the follower projects away from a surface of the vehicle, such as downwardly from a lower surface of the vehicle. The central follower 126 engages the channel in the guide 880 to constrain horizontal movement of the vehicle.

Optionally, the vehicle may also include one or more lateral guide member 127. The lateral guide members 127 may cooperate with an outer surface of the guide 880 to constrain movement of the vehicle. For instance, guides 880 may comprises circular guides having a circumferential surface for guiding the rotation of the vehicles. The vehicle may have a pair of lateral guide members 127 spaced apart from one another a distance equal to the diameter of the circumferential surface of the guide. In this way, the lateral guides 127 engage the circumferential surface of the guide to constrain the vehicle to rotational motion.

Referring to FIG. 8, optionally the guide 880 includes a plurality of intersecting guideways. For instance, guide 880 may include a first guideway 882 in the form of a groove or channel having walls spaced apart a distance substantially similarly to the width of central follower 126 of the vehicle. The first guideway 882 may be oriented so that it extends parallel to pathway 860. Additionally, guide 880 may have a second guideway 884 in the form of a groove or channel have walls spaced apart a distance substantially similar to the width of the follower 126 of vehicle 100. The second guideway 884 may be oriented so that it extends transverse pathway 860. In the present instance, guideway 884 extends substantially perpendicular to pathway 860. In this way, the first and second guideways 882, 884 of guide 880 extend in a linear direction that is preferably parallel or perpendicular to the aisle 850.

Guide 880 may optionally include a non-linear guideway. For instance, the perimeter of the guide may form a non-linear guide surface identified as 886 in FIG. 9. Specifically, the guide may have a substantially circular profile forming a circumferential bearing surface. The diameter of the circular profile may have a diameter corresponding to the distance between lateral guides 127 of the vehicle 100 (see FIG. 3).

The guideways of the guide 880 optionally intersect to facilitate changing the direction of travel for the vehicle. For instance, guideway 882 may intersect guideway 884 to facilitate the vehicle changing direction from parallel to the aisle to perpendicular to the aisle or vice versa. The guideways 882, 884 may intersect at a center point of the guide. In this way, the guide may facilitate rotation of the vehicle about a vertical axis to turn the vehicle from one direction of travel along guideway 882 to a second direction of travel along guideway 884.

The guide 880 may guide the vehicle 100 to change direction as follows. The vehicle may move along a linear path with central follower 884 engaging guideway 882 or 884 to impede lateral displacement away from the linear path. The vehicle travels in a horizontal direction along the linear path until the central follower is positioned at the center point of the guide with the lateral guides 127 of the vehicle engaging the circumferential guideway 886. The vehicle 100 is rotated above a vertical axis to change the direction of travel. For instance, drive wheel 124 on one side of the vehicle may be rotated in a first direction while drive wheel 124 on the opposite side of the vehicle is rotated in a second direction that is reverse of the first direction to perform a zero radius turn. While the drive wheels 124 rotate the vehicle about the axis of rotation, the lateral guides 127 impede lateral displacement of the vehicle away from the rotational path.

Optionally, the guides 880 are aligned with the columns to facilitate rotation of the vehicle within the column while aligning the width of the vehicle with the opening between posts 815 at the front of the column (adjacent the aisle 850) or at the back of the column (remote from aisle 850).

Optionally, as shown in FIG. 9, the system may include a floor mounted lateral alignment system 890 which consists of a pair of plate members separated by gap $g_G$. In this instance, the gap defined by alignment system 890 is oriented with those defined by alignment system 895 so as to permit a vehicle to quickly and easily traverse the entire width of the structure while maintaining a generally constant angular orientation within the drive columns D1 to D6.

As described above, a plurality of guide elements, such as track elements 840 may be attached to the rack 800 to guide the vehicles into alignment with storage locations positioned above the floor. For instance, the track 840 may comprises a plurality of vertical sections. Specifically, a vertical track section may be attached to each post within the aisle 850. Referring to FIG. 10, the vertical track section may have a profile for engaging the vertical drive system 140 of the vehicle. For instance, the track may include a plurality of teeth forming a rack extending up the height of the post 815.

As shown in FIG. 10, the track 840 may straddle the aisle so that a first track extends vertically upwardly along a first side of the column and a second track extends upwardly along a second side of the column. For instance, column D1 and vehicle 100e of FIG. 10 are illustrated in FIG. 10. Column D1 includes two spaced apart vertical posts 815 forming an opening having a width. Specifically, a first post has a first vertical edge E1 and a second vertical edge E2; and a second post has a first vertical edge E3 and a second vertical edge E4. The distance between vertical edges E2 and E3 is greater than the width W1 of the vehicle (see FIG. 5). Optionally, the distance between vertical edges E2 and E3 is less than the width W2 of the vehicle (see FIG. 5). In this way, the column width may be less than the distance between the outer tips of the gears of the vertical drive 140 of vehicle 100. Accordingly, the majority of the column may be narrower than the width of the vehicle at its widest point.

Optionally, the track 840 may be configured so that a first edge of the track projects toward a first column to provide a guide surface for the first column and a second edge of the track projects toward a second column to provide a guide surface for an adjacent column. For instance, track 840 may provide a first set of teeth projecting toward column D1 and a second set of teeth projecting toward column D2.

Additionally, the vertical posts 815 may optionally be configured to provide a stop to impede lateral displacement of the vehicle as the vehicle climbs the track 840. For instance, referring to FIG. 10 the post 815 overlaps with the teeth of track 840 so that edge E3 of post 815 extends beyond the root of the teeth of the track and preferably toward the crests of the track. In this way, the teeth of the vertical drive 140 mesh with the track while the post impedes the vertical drive from displacing laterally parallel to the depth of the column.

The vertical drive 140 of the vehicle 100 may be configured so that the vertical drive gears 145 are displaceable inwardly to reduce the distance between the vertical drive gears. In this way, the drive gears can be moved inwardly to provide clearance between the tracks 840 and the vertical drive gears as the vehicle drives into the column. Alternatively, as described above, the vertical drive gears may be mounted on shafts so that the axis of rotation of each vertical gear is substantially parallel to the horizontal direction of travel. Additionally, the axes of rotation of the vertical drive gears may be substantially fixed so that the lateral distance between each pair of vertical drive gears is substantially fixed. To enter the column, the teeth of the vertical drive teeth are aligned with the teeth in the track 840 so that the teeth of the vertical drive gears pass through the teeth in the track.

Referring to FIG. 10, the track 840 and the vertical drive gear 145 may be aligned so that the vertical drive gears do not impinge upon or contact the track when the vertical gear is translated relative to the track. For instance, the spacing between the teeth of track 840 provides sufficient clearance for the teeth of the vertical drive gear 145 to pass between the gaps between the teeth of track 840 when the vertical drive gear translates horizontally along a line that is parallel to the axis of rotation of the vertical drive gear 145. More specifically, the vertical drive gear and the track may be configured and positioned so that the addendum circle of the vertical drive gear 145 overlaps with the addendum line of the teeth in the track 840. While the addendum circle of the drive gear overlaps the addendum line of the track, the teeth of the gear are configured and oriented so that the vertical drive gear passes through the gaps between teeth in the track 840.

Referring again to FIG. 10, optionally, the vertical drive gear 145 and the track 840 may be configured and oriented to increase the clearance for the vertical drive gear to pass through the track when the vehicle drives the opening between the vertical posts 815 forming the width of the column (i.e. when the vertical drive gear translates so that the axis of rotation of the vertical drive gear translates in a horizontal direction perpendicular to the aisle). For instance, the track 840 may have an upper portion and a lower portion 842. The upper portion may have a tooth pitch and configuration to mate with the teeth of the vertical drive gear 145. The lower portion 842 may have a tooth pitch that is substantially similar to the tooth pitch of the upper section, but the tooth profile of the lower section may be substantially different than the upper section. For instance, the teeth of the lower section may be substantially narrower than the teeth of the upper section. For instance, the teeth may be at least 10% narrower and preferably at least 20% narrower. Optionally or additionally, the teeth of the lower section 842 may have dedendum that is substantially greater than the dedendum of the upper section. For instance, the dedendum of the lower section may be greater than the upper section so that the root of the teeth extends inwardly away from the drive gears a greater distance than the root of the teeth of the upper section. For instance, the dedendum of the teeth of the lower section may be 10% greater and preferably is 20% greater.

Additionally, the lower section 842 may optionally have a tapered pitch line so that the clearance between adjacent teeth gradually diminishes as the teeth progress up the height of the lower section. In other words, the clearance 845 between adjacent teeth at the bottom of the lower section is greatest and the spacing between adjacent teeth at the upper part of the lower section is at a minimum and the clearance gradually decreases from the maximum to the minimum.

Optionally, the posts 815 may have a variable width to facilitate the vertical drive passing through the opening between the posts 815. For instance, as described above, posts 815 may have a first width so that the edge E3 of the post extends beyond the root of the teeth of the track. Additionally, the lower portion 816*a,b* of the post 815 may wave a reduce width relative to the upper portion of the post. Specifically, the post may have a reduced width so that the edge of the post terminates below the root of the tooth. In this way, the lower portion of the post has a width that is narrower than the upper portion of the post. Similarly, the distance between lower post 816*a* and lower post 816*b* is greater than the distance between edge E2 and edge E3. Additionally, the opening to the column between lower portion 816*a* and 816*b* is greater than the widest width W2 of the vehicle.

Configured as described above, the vertical drive 140 may optionally be configured to pass through openings in the track so that the vertical drive is aligned with the track. After the vertical drive is aligned with the track, the vertical drive is positioned to cooperate with the track to raise the track and/or to climb the track as described further above.

As noted above, a central controller 450 may provide control signals for controlling the vehicles 100. For instance, the central controller may control the operation of a vehicle to follow a path through the rack to retrieve a tote 55 from a storage location 820 in one of the columns 810 in the rack 800. The vehicle may follow a path along the ground to align the width of the vehicle with a path that extends through an opening between two vertical posts 815 of the rack 800. The vehicle may travel along the path crossing through a plurality of columns in the rack. Optionally, the central controller may provide signals to control a second vehicle so that the second vehicle travels along a second path parallel to the first path and under the same rack as the first vehicle so that the second vehicle passes the first vehicle under the rack.

After the vehicle passes through a plurality of columns under the rack, the vehicle reaches the column in the rack the select storage location is located. The central controller provides signals to stop the forward progress of the vehicle along the path. The central controller provides signals to turn the vehicle under the rack to align the vehicle with an opening in the column. After turning, the vehicle advances along a path parallel to the depth of the column so that the vehicle passes through the opening in the column and into the aisle. Optionally, the step of advancing the vehicle into the aisle includes the step of aligning a vertical drive element with gaps in the opening in the column. Once in the aisle, the vehicle is driven vertically upwardly until the vehicle is aligned with the desired storage location. The vehicle actuates a transfer mechanism to transfer an item from the storage location on the vehicle. Optionally, the storage location may include an item at the front edge of the storage location separating the vehicle from the desired item in the storage location. Accordingly, the vehicle may transfer the item at the front edge onto the vehicle, which in turn pulls the desired item to the front edge of the storage location. The vehicle is then driven vertically to a storage location having an open location for receiving an item. The vehicle then transfers the item toward the open location. The vehicle then moves vertically to the storage location having the desired item and drives the transfer mechanism to transfer the desired item onto the vehicle. After retrieving the desired item, the vehicle actuates the vertical drive mechanism to drive down the column until the vehicle engages a horizontal drive surface, such as the floor. The horizontal drive of the vehicle is engaged to drive the vehicle through the opening in the column in a direction transverse the aisle. After driving out of the aisle, the vehicle continues to drive in a horizontal direction to exit the rack 800. For instance, the vehicle may continue along a path transverse the aisle 850 and pass under one or more additional racks 800 and cross one or more additional aisles 850. Following such a path, the path of the vehicle is controlled so that the width of the vehicle is aligned with the opening in each column that the vehicle passes through. Alternatively, the vehicle is rotated around a vertical axis to turn the vehicle into alignment with a path parallel with the aisle while the vehicle remains under the rack. The vehicle then crosses under one or more columns of the rack 800 until the vehicle exits from under the rack.

After the vehicle exits the rack 800, the central controller 450 may control the vehicle to direct the vehicle to one of a plurality of workstations 500. At the workstation the vehicle is presented to an operator to remove one or more items from the vehicle. The central controller may then control the vehicle to direct the vehicle along a path to store the item it is carrying in an open storage place in the rack and retrieve a subsequent item at a different storage location. In this way, the central controller provides control signals to a plurality of vehicles to direct the vehicles along one of a plurality of paths to retrieve a plurality of items from the storage locations and deliver items to the workstation 500.

Control Process

Figure 11:
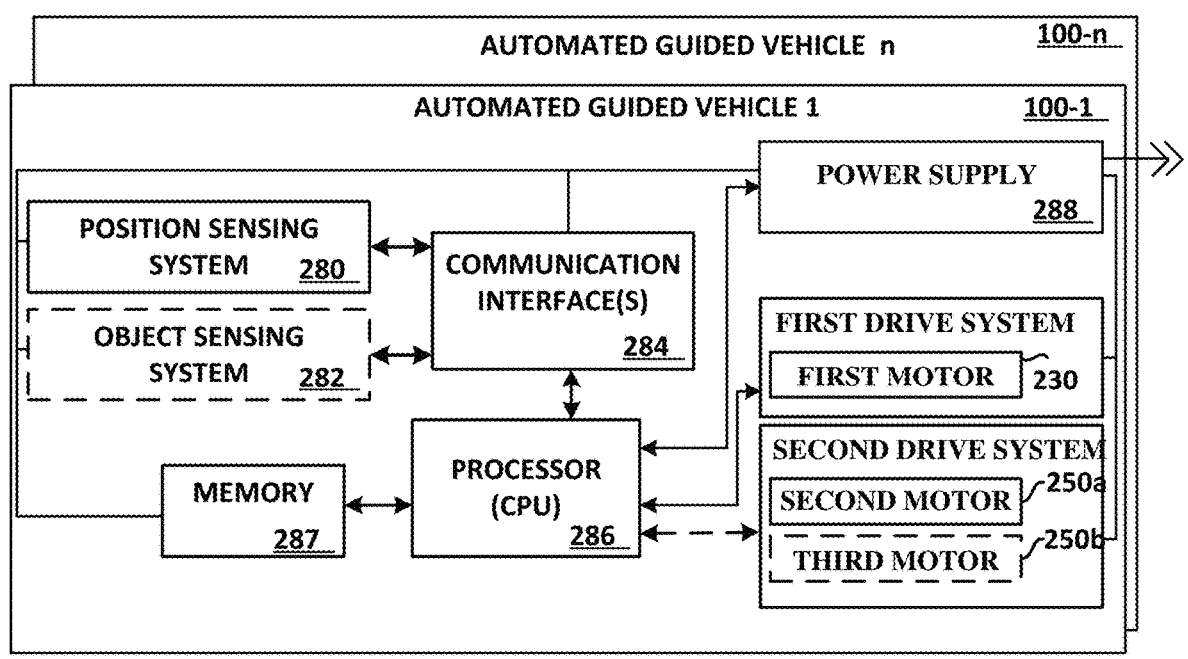
FIG. 11 is a block diagram depicting the subsystems of a plurality of guided vehicles according to one or more embodiments.

FIG. 11 is a block diagram depicting the subsystems of a plurality of guided vehicles 100-1 to 100-n, according to one or more embodiments. Each vehicle, as vehicle 100-1 may comprise a Central Processing Unit (CPU) 103, a memory 105, and communication interfaces. In some embodiments, the communication interfaces comprise one or more wireless transceivers compliant with corresponding wireless transmission protocol(s) such as IEEE 802.11, with the interfaces of a vehicle being used to communicate with other vehicles, as in a peer-to-peer topology, or with a central controller. In the latter regard, vehicles 100-1 to 100-n may include position sensors 280 and object sensors 282 and use the interfaces to communicate sensed information with a master controller, such as central controller 450. The position sensors, in one or more embodiments, include onboard imaging sensors for determining when the vehicle has passed over a fiducial marking positioned on an underlying support surface. Alternatively, however, the vehicles 100-1 to 100-n may utilize signal triangulation and/or any other conventional technique for determining their respective locations relative to one another or enabling the controller to do so.

Each vehicle 100-1 includes a power supply 288 which may, for example, be a rechargeable power supply comprising ultracapacitors, one or more batteries, or a combination of these. In one or more embodiments, the power supply drives a first motor 230 of first drive system. First drive system may further include gear wheels driven by the first motor and used, for example, to drive the vehicle vertically. In the present instance, the power supply 288 also supplies power to a second drive system, which includes a second motor 250a and, optionally, a third motor 250b.

The CPU 286 may comprise one or more commercially available microprocessors or microcontrollers that facilitate data processing and storage. Various support circuits facilitate the operation of the CPU 286 and include one or more clock circuits, power supplies, cache, input/output circuits, and the like. The memory 287 comprises at least one of Read Only Memory (ROM), Random Access Memory (RAM), disk drive storage, optical storage, removable storage and/or the like.

Figure 12:
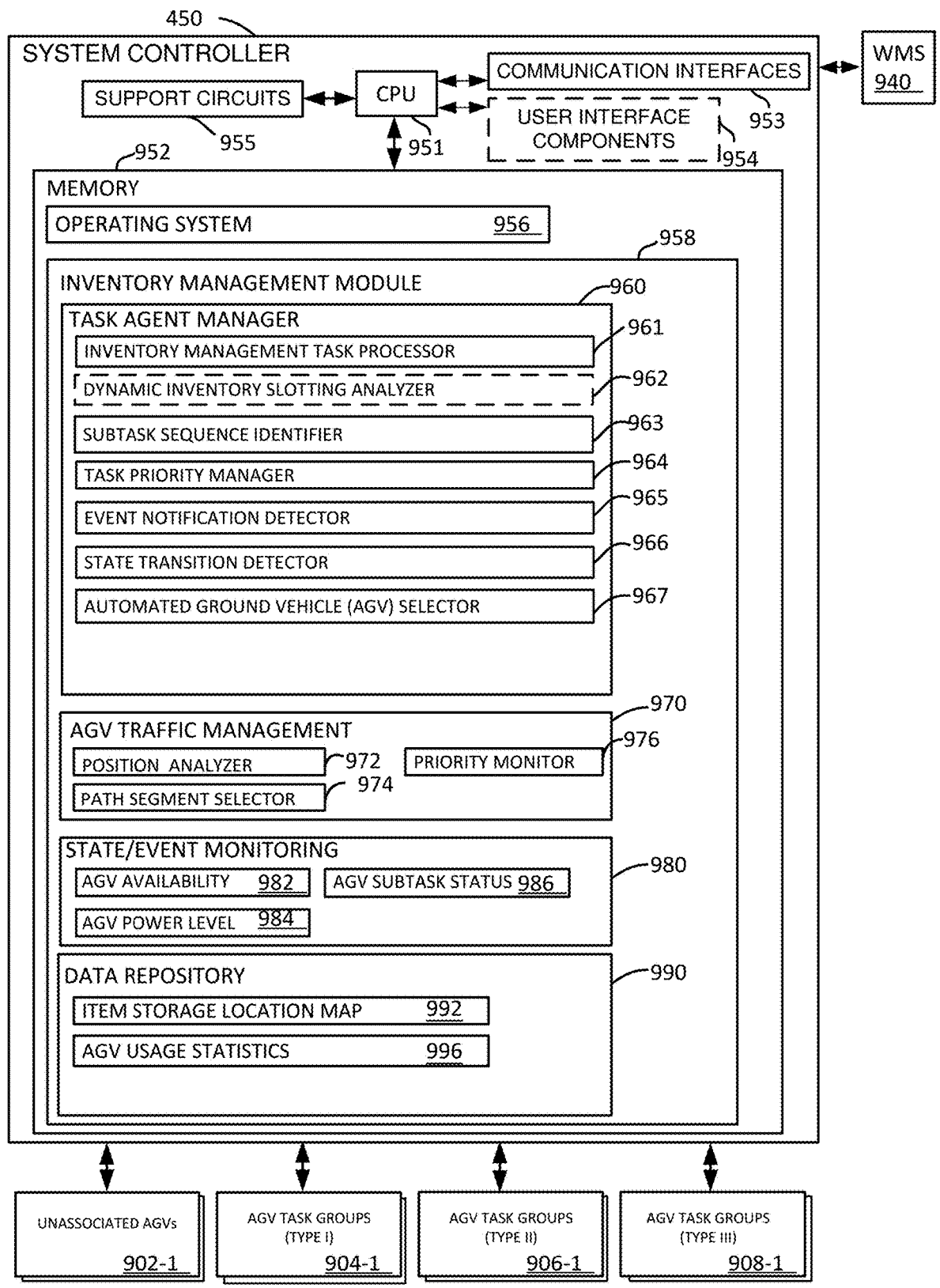
FIG. 12 is a block schematic diagram of a controller of the system illustrated in FIG. 1.

FIG. 12 is a block schematic diagram of a controller 450 which may be responsive to instructions received from a warehouse automation system (WMS) 1440 to coordinate the assignment and performance of inventory management task activities by a plurality of vehicles and subassemblies (e.g. moveable track 700 or flow rack 600), such as those assigned to AGV task groups 902-1, 904-1, 906-1 and 908-1. The controller 450 comprises a Central Processing Unit (CPU) 951, support circuits 955, a memory 952, user interface components 954 (which may include, for example, a display with touch sensitive screen or a separate keyboard), and communication interfaces 953. In some embodiments server 450 comprise one or more wireless transceivers compliant with corresponding wireless transmission protocol(s) such as IEEE 802.11.

The CPU 951 may comprise one or more commercially available microprocessors or microcontrollers that facilitate data processing and storage. The various support circuits 955 facilitate the operation of the CPU 951 and include one or more clock circuits, power supplies, cache, input/output circuits, and the like. The memory 952 comprises at least one of Read Only Memory (ROM), Random Access Memory (RAM), disk drive storage, optical storage, removable storage and/or the like. In some embodiments, the memory 952 comprises an operating system 956 and one or more inventory management applications. In some embodiments, the inventory management applications include a task agent manager module 960, an AGV traffic management module 970, a state/event monitoring module 980, and a data repository 990.

In one or more embodiments, the task agent manager 960 is configured with an inventory management task processor 961, a dynamic inventory slotting analyzer 962, a subtask sequence identifier 963, a task priority manager 964, an event notification detector 965, a state transition detector 966, and an AGV selector 967. The inventory management task processor 961, through execution of instructions by CPU 951, processes inventory management task requests received from the WMS 940.

In some embodiments, traffic management of the AGVs is performed by a traffic management module 470 of controller 450. In such cases, position, speed and direction data is collected from the vehicles at regular intervals by the controller. The position data is analyzed, and path segment selector 474 selects paths for each vehicle over the next control interval to ensure that there are no collisions with other vehicles, with personnel, or with fixed structures. The updated instructions corresponding to the path selections, inclusive of heading and direction, are transmitted by the controller back to the vehicles. In other embodiments, however, the vehicles do not rely on the controller for relative positioning instructions, but rather solely for destination and task assignments, with the vehicles instead relying on internal data gathering and spatial analysis capabilities.

To facilitate the aforementioned operations, the controller 450 of FIG. 12 includes a data repository which reflects an up to date location of all inventory items for which management and allocation responsibility has been assigned by the WMS, as well as a map of the vehicle locations within the facility. In addition, to facilitate the scheduling of preventive maintenance procedures, usage statistics are collected for all AGVs having moving parts, so that at regular intervals, parts can be inspected, lubricated, and/or replaced.

The order of methods described herein may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Accordingly, while the foregoing is directed to embodiments of the present invention, other and further embodiments of the invention may be devised without departing from the basic scope thereof, and the scope thereof is determined by the claims that follow.

We claim:

1. A material handling system for delivering items to storage locations and retrieving items from storage locations, comprising:
    a first storage rack having a plurality of storage locations;
    a second storage rack having a plurality of storage locations, wherein the first storage rack is spaced apart from the first storage rack to provide an aisle between the first and second storage racks;
    a plurality of delivery vehicles wherein each vehicle has a length and a width and each vehicle comprises:
        a horizontal drive system operable to drive the vehicle along a horizontal surface;
        a vertical drive operable to drive the vehicle vertically; and
        a transfer mechanism operable to transfer an item between the vehicle and one of the storage locations;
    a track positioned in the aisle wherein the vertical drive is configured to cooperate with the track to drive the vehicle vertically upwardly;
    wherein each of the first and second storage racks comprise a pair of vertical aisle posts adjacent the aisle and a pair of remote vertical posts spaced apart from the aisle posts a distance sufficient to allow the delivery vehicles to rotate while the delivery vehicles are under the first and second storage racks.

2. The material handling system of claim 1 comprising a central controller comprising a microprocessor programmed to provide control signals to control the delivery vehicles to perform the steps of:
    controlling the horizontal drive of a first of the vehicles to drive the first vehicle along a horizontal surface under the first storage rack;
    turning the vehicle under the first rack;
    driving the first vehicle into the aisle;
    controlling the vertical drive of the first vehicle to climb the track;
    actuating the transfer mechanism to transfer the item between the first vehicle and one of the storage locations;
    controlling the vertical drive of the first vehicle to move down the track to the horizontal surface after the step of actuating the transfer mechanism;
    driving the first vehicle out of the aisle after the step of controlling the vertical drive of the first vehicle to move down the track.

3. The material handling system of claim 2 wherein the central controller is programmed to provide control signals to control the delivery vehicles to perform the step of driving the first vehicle under the first rack or the second rack after the step of driving out of the aisle.

4. The material handling system of claim 3 wherein the central controller is programmed to provide control signals to control the delivery vehicles to perform the step of turning the first vehicle under the first rack or the second rack after the step of driving the first vehicle out of the aisle.

5. The material handling system of claim 4 wherein the central controller is programmed to provide control signals to control the delivery vehicles so that the step of turning the first vehicle under the first or second rack comprises the step of turning the first vehicle between the pair of aisle posts and the set of remote posts.

6. The material handling system of claim 1 wherein the horizontal drive is configured to turn the vehicle under the first rack by rotating the vehicle about a vertical axis that extends through the vehicle.

7. The system of claim 2 wherein the vertical drive comprises a plurality of rotatable elements that each rotate about a horizontal axis and wherein the horizontal drive comprises a plurality of rotatable elements that each rotate about a horizontal axis transverse the axes of rotation of the vertical drive elements.

8. The system of claim 1 wherein the vehicles have a first width extending from a first side of the vehicle to a second side of the vehicle and wherein the vertical drive of the vehicle projects outwardly from the first side and the second side so that the vehicle has a second width corresponding to the distance between outer edges of the vertical drive so that the second width is greater than the first width and wherein the aisle posts are spaced apart a distance greater than the first width and less than the second width.

9. The system of claim 8 wherein the track comprises drive elements configured to cooperate with the vertical drive so that rotating the vertical drive about a horizontal axis operates to drive the vehicle upwardly along the track.

10. The system of claim 9 wherein the track comprises a lower section and an upper section wherein the drive elements are spaced apart further in the lower section then the upper section to provide gaps in the lower section.

11. The system of claim 10 wherein the gaps are configured to facilitate the vertical drive passing through the gaps without contacting the lower section when the vehicle is driven past the lower section.

* * * * *